US012691916B2

(12) United States Patent
Weil et al.

(10) Patent No.: US 12,691,916 B2
(45) Date of Patent: Jul. 28, 2026

(54) VEHICLE COMMAND ARCHITECTURE

(71) Applicant: Parallel Systems, Inc., Los Angeles, CA (US)

(72) Inventors: Ethan Weil, Los Angeles, CA (US); Geordie Roscoe, Los Angeles, CA (US); Patrick Dunn, Los Angeles, CA (US); Alex Maynard, Los Angeles, CA (US); August Soderberg, Los Angeles, CA (US); Thomas Praderio, Los Angeles, CA (US)

(73) Assignee: Parallel Systems, Inc., Los Angeles, CA (US)

( * ) Notice: Subject to any disclaimer, the term of this patent is extended or adjusted under 35 U.S.C. 154(b) by 0 days.

(21) Appl. No.: 19/329,286

(22) Filed: Sep. 15, 2025

(65) Prior Publication Data

US 2026/0084732 A1     Mar. 26, 2026

Related U.S. Application Data

(60) Provisional application No. 63/697,745, filed on Sep. 23, 2024.

(51) Int. Cl.
B61L 27/20 (2022.01)
B61L 15/00 (2006.01)
(Continued)

(52) U.S. Cl.
CPC .......... B61L 27/20 (2022.01); B61L 15/0027 (2013.01); B61L 27/04 (2013.01); B61L 27/16 (2022.01); H04L 43/10 (2013.01)

(58) Field of Classification Search
CPC ...... B61L 27/10; B61L 15/0027; B61L 27/04; B61L 27/16; H04L 43/10
See application file for complete search history.

(56) References Cited

U.S. PATENT DOCUMENTS 3,848,533 A     11/1974  Grow
11,305,796 B1     4/2022  Shue et al.
(Continued)

FOREIGN PATENT DOCUMENTS

CA     3074977 A1     10/2020
CA     3217373 A1 *  12/2022   .............. B61L 27/04
(Continued)

OTHER PUBLICATIONS

Dunn, et al., "Rail Authority System and/or Method", U.S. Appl. No. 18/373,225, filed Sep. 26, 2023.
(Continued)

*Primary Examiner* — Mary Cheung

(74) *Attorney, Agent, or Firm* — Jeffrey Schox; Evan Myers

(57) ABSTRACT

The system can include a motion planner and a vehicle controller. The system can optionally include or operate in conjunction with a remote operator platform, a remote data system 130, and/or any other suitable components. However, the system can additionally or alternatively include any other suitable set of components. The system can function to facilitate causal command of a vehicle based on the vehicle state. Additionally, the system can function to maintain positive train control (PTC) with the distributed command architecture.

19 Claims, 10 Drawing Sheets

(51) Int. Cl.

| | |
|---|---|
| *B61L 27/04* | (2006.01) |
| *B61L 27/16* | (2022.01) |
| *H04L 43/10* | (2022.01) |

(56) References Cited

U.S. PATENT DOCUMENTS

| | | | |
|---|---|---|---|
| 2004/0006413 A1 | 1/2004 | Kane et al. | |
| 2004/0010432 A1 | 1/2004 | Matheson et al. | |
| 2006/0074544 A1 | 4/2006 | Morariu et al. | |
| 2007/0005200 A1 | 1/2007 | Wills et al. | |
| 2007/0150130 A1 | 6/2007 | Welles et al. | |
| 2009/0184211 A1 | 7/2009 | Groves et al. | |
| 2012/0203419 A1 | 8/2012 | Tucker et al. | |
| 2015/0008294 A1 | 1/2015 | Desbordes et al. | |
| 2015/0191186 A1 | 7/2015 | Lucisano | |
| 2016/0368495 A1 | 12/2016 | Luther et al. | |
| 2016/0375888 A1 | 12/2016 | Allwardt | |
| 2017/0108876 A1 | 4/2017 | Mullan et al. | |
| 2017/0320507 A1 | 11/2017 | Denny et al. | |
| 2018/0079436 A1 | 3/2018 | Fifield | |
| 2018/0120862 A1 | 5/2018 | Dembinski et al. | |
| 2018/0231972 A1 | 8/2018 | Woon et al. | |
| 2018/0339719 A1 | 11/2018 | Loughlin | |
| 2019/0054929 A1 | 2/2019 | Yao et al. | |
| 2019/0176862 A1 | 6/2019 | Kumar et al. | |
| 2019/0281052 A1 | 9/2019 | Lekkas | |
| 2019/0389498 A1 | 12/2019 | Grimm et al. | |
| 2021/0094567 A1 | 4/2021 | Imai et al. | |
| 2021/0094597 A1 | 4/2021 | Rush et al. | |
| 2021/0132625 A1 | 5/2021 | Gillett | |
| 2021/0188332 A1 | 6/2021 | Brooks et al. | |
| 2021/0291883 A1 | 9/2021 | Gotlund et al. | |
| 2022/0137623 A1 | 5/2022 | Goyal et al. | |
| 2022/0185350 A1 | 6/2022 | Kindt et al. | |
| 2023/0063561 A1 | 3/2023 | Nobileau | |
| 2024/0166250 A1 | 5/2024 | Dunn et al. | |
| 2024/0296068 A1 | 9/2024 | Tadkase et al. | |

FOREIGN PATENT DOCUMENTS

| | | | | | |
|---|---|---|---|---|---|
| CN | 102521868 A | | 6/2012 | | |
| CN | 103164750 A | | 6/2013 | | |
| CN | 106230576 A | * | 12/2016 | ........... | H04L 7/0016 |
| CN | 107948570 A | | 4/2018 | | |
| CN | 110775109 A | * | 2/2020 | .............. | B61L 27/10 |
| CN | 111414518 A | | 7/2020 | | |
| CN | 111652935 A | | 9/2020 | | |
| CN | 112448782 A | | 3/2021 | | |
| CN | 112810495 A | * | 5/2021 | .............. | B60L 53/66 |
| CN | 110758477 B | | 11/2021 | | |
| CN | 114067290 A | | 2/2022 | | |
| CN | 116664388 A | | 8/2023 | | |
| CN | 116935615 A | * | 10/2023 | .............. | G08G 1/202 |
| CN | 117279085 A | * | 12/2023 | ......... | H04W 56/001 |
| CN | 112613509 B | | 7/2024 | | |
| JP | 6851278 B2 | | 3/2021 | | |
| WO | 2017211593 A1 | | 12/2017 | | |
| WO | 2018026615 A1 | | 2/2018 | | |
| WO | 2018054616 A1 | | 3/2018 | | |
| WO | 2022192795 A2 | | 9/2022 | | |
| WO | 2022263144 A1 | | 12/2022 | | |

OTHER PUBLICATIONS

Dunn, et al., "Rail Control System and/or Method", U.S. Appl. No. 18/499,034, filed Oct. 31, 2023.

Dunn, et al., "Remote Rail Monitoring System and/or Method", U.S. Appl. No. 18/776,069, filed Jul. 17, 2024.

Dunn, et al., "System and/or Method for Remote Operation of a Rail Vehicle", U.S. Appl. No. 18/514,946, filed Nov. 20, 2023.

Fraga-Lamas, et al., "Towards the Internet of Smart Trains: A Review on Industrial IoT Connected Railways", Sensors, Jun. 21, 2017, URL: https://www.mdpi.com/1424-8220/17/6/1457.

Greenbaum, et al., "Railway Switch Management System and/or Method", U.S. Appl. No. 18/672,864, filed May 23, 2024.

Pendleton, et al., "Perception, Planning, Control, and Coordination for Autonomous Vehicles", Google Scholar, M DPI Machines, Feb. 2017, pp. 1-54. (Year: 2017).

Sanaei, et al., "Interface for a Railway Control System", Chalmers University of Technology, Dec. 13, 2011, <URL: http://odr.chalmers.se/bitstreams/fcb1915c-254a-4c15-b364 66d99a4c2167/download>.

Singh, Prashant, "Deployment of Autonomous Trains in Rail Transportation: Current Trends and Existing Challenges", Google Scholar , IEEE Access, vol. 9, Jun. 2021, pp. 91427-91461. (Year: 2021).

Karolak, et al., "Temporal Verification of Relay-Based Railway Traffic Control Systems Using the Integrated Model of Distributed Systems", Energies 2022, 15, 9041. https://doi.org/10.3390/en15239041.

* cited by examiner

VEHICLE COMMAND ARCHITECTURE

CROSS-REFERENCE TO RELATED APPLICATIONS

This application claims the benefit of U.S. Provisional Application No. 63/697,745, filed 23 Sep. 2024 which is incorporated in its entirety by this reference.

This application is related to U.S. application Ser. No. 19/098,108, filed Apr. 2, 2025, which is a continuation of U.S. Application Ser. No. 18,666,128, filed May 16, 2024, which is a continuation of U.S. application Ser. No. 18/373, 225, filed Sep. 26, 2023, which claims the benefit of U.S. Provisional Application Ser. No. 63/423,355, filed Nov. 7, 2022, and U.S. Provisional Application Ser. No. 63/410,031, filed Sep. 26, 2022, each of which is incorporated herein in its entirety by this reference.

This application is related to U.S. application Ser. No. 19/081,268, filed May 17, 2025 which is a continuation of U.S. application Ser. No. 18/776,069, filed Jul. 17, 2024, which claims the benefit of U.S. Provisional Application No. 63/527,186, filed Jul. 17, 2023, both of which are incorporated herein in their entirety by this reference.

STATEMENT OF GOVERNMENT SUPPORT

This invention was made with government support under Award Number DE-AR0001589 awarded by the Department of Energy. The government has certain rights in the invention.

TECHNICAL FIELD

This invention relates generally to the transportation field, and more specifically to a new command architecture system and/or method in the transportation field.

BACKGROUND

Figure 1:
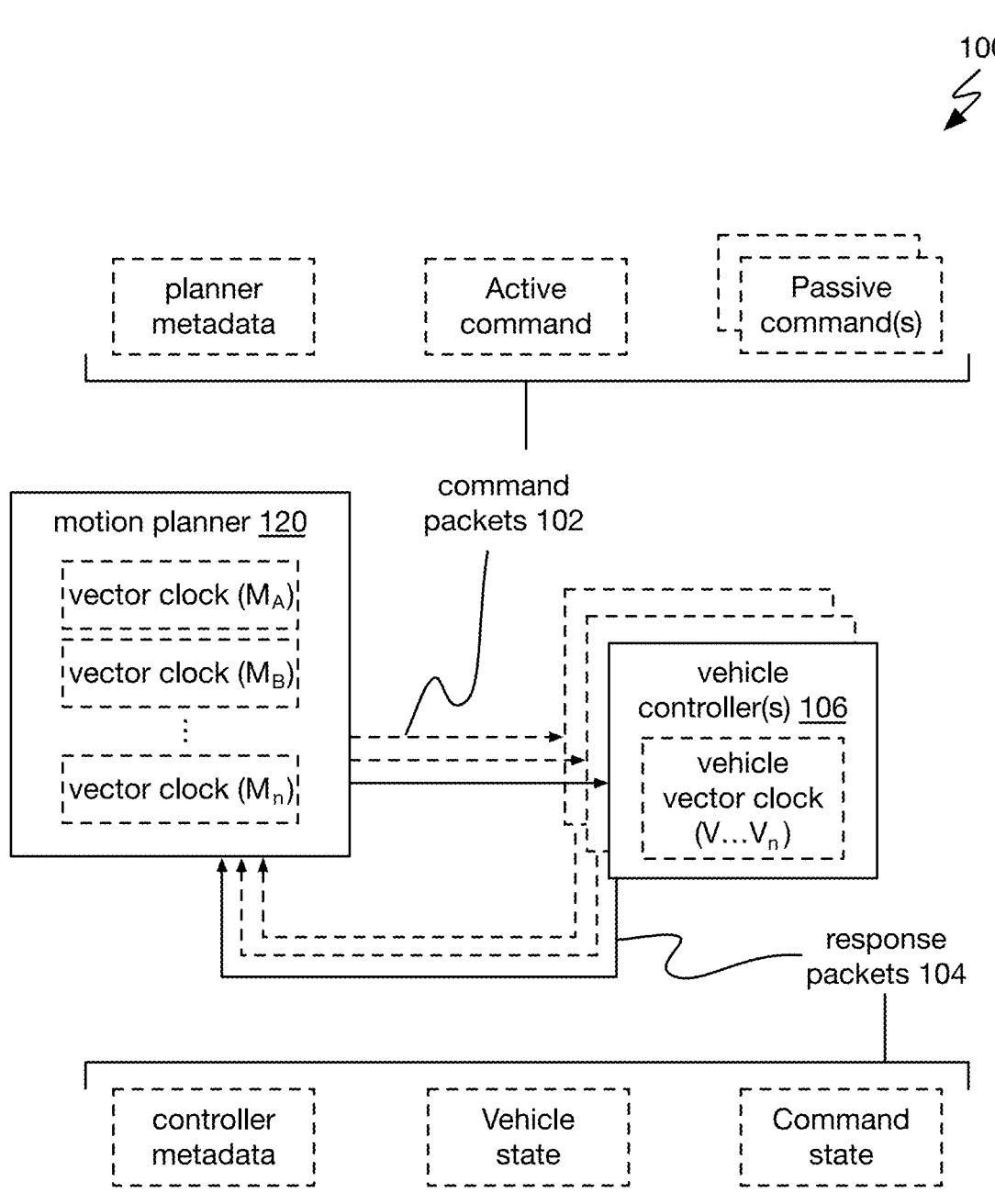
FIG. 1 is a schematic representation of a variant of the system.

Vector clocks are used in Internet of Things (IoT) settings for incrementing the partial ordering of events in distributed systems with concurrent operations to establish causal consistency. However, conventional vector clocks implementations are not typically robust to asynchronous, high-latency communication.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

The system 100 can include a motion planner 120 and a vehicle controller 106. The system can optionally include or operate in conjunction with a remote operator platform 110, a remote data system 130, and/or any other suitable components. However, the system 100 can additionally or alternatively include any other suitable set of components. The system can function to facilitate causal command of a vehicle based on the vehicle state. Additionally, the system may function to maintain and/or facilitate positive train control (PTC) with the distributed command architecture, and/or the system can have any other suitable functionalities.

The term "substantially" as utilized herein can mean: exactly, approximately, within a predetermined threshold or tolerance, and/or have any other suitable meaning.

1.1 Illustrative Examples

The system can include a motion planner and a plurality of vehicle controllers, each configured to control a respective autonomous rail vehicle within a rail network. The motion planner periodically transmits command packets (wirelessly) to each of the vehicle controllers, which include commands directing operation of the vehicle(s) throughout the rail network. The vehicle controller provides a response packet to the motion planner, which includes the vehicle state estimate (e.g., maintained by the vehicle controller). The system maintains causality between the command and response packets using a respective vector clock for each vehicle controller: each vehicle controller maintains a first logical clock which increments motion planner logic updates and a second logical clock which increments the vehicle command logic updates (e.g., which may occur entirely independently of vehicle commands, such as in the case of an autonomous braking event or emergency stop related to an onboard component failure). Similarly, the motion planner maintains a respective vector clock for each vehicle (and/or vehicle controller thereof), incrementing the first and second logical clocks based on communication transmission and receipt at the motion planner. For example, where the motion planner manages a number of vehicles N, the motion planner maintains 2N logical clocks (i.e., two per vehicle; corresponding to the respective vector clock for each vehicle). The vector clocks are included in the metadata of command packets 102 and response packets 104 and used to establish causality—where command state updates (based on incoming command packets) occur in response to establishing on a causal relationship between the logical clocks and/or prior communications (i.e., where partial ordering of events has been established; allowing command state transitions at the vehicle controller; for example, the vehicle controller may replace the current command with a succeeding command relative to the vector clock state, and may ignore commands preceding the current command relative to the vector clock state). Concurrently with command communications, the vehicle controller may act entirely independently of the motion planner commands (e.g., without coordination of vector clocks; autonomously braking in an emergent scenario; disabling the vehicle in response to fault detection; etc.), which may iterate the second logical clock; vice versa the motion planner can act concurrently and independently of vehicle motion to update the commands. Accordingly, both the motion planner and the vehicle controller increment the vector clock each time a valid response packet is received and at each intrinsic update. To accommodate latency and asynchronous communications, commands can remain valid for a period after transmission (e.g., overlapping, persisting, repeating, etc.) such that the vehicle state machine and the existing commands enable substantially continuous operation of the vehicle and/or PTC (e.g., even when causality violations exist).

Figure 3A:
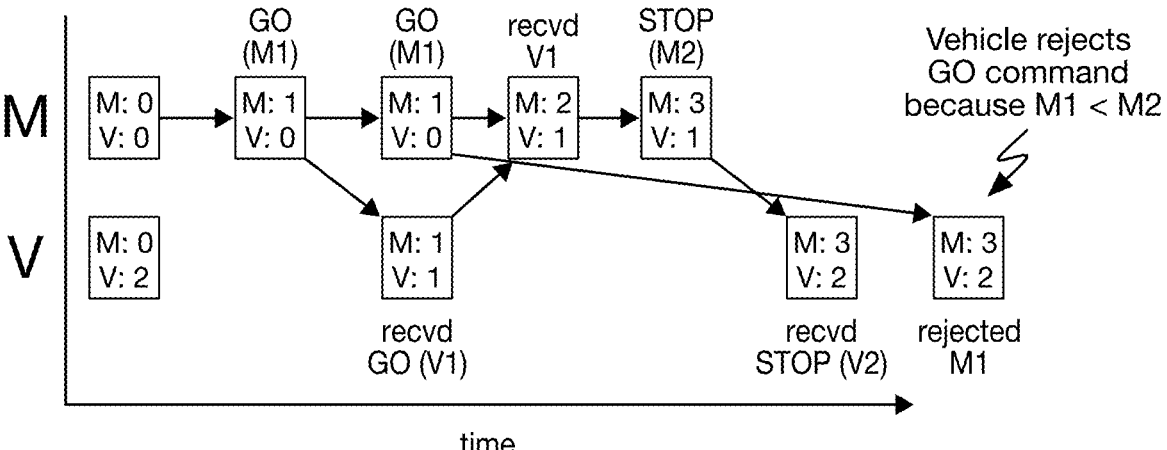
FIGS. 3A-3F are graphical illustrations of vector clock incrementing for a variant of the command architecture.

Motion planner command packets can be transmitted recurrently/repeatedly while they remain valid (e.g., without incrementing the vector clock) and/or until receipt is confirmed, such that a single transmission failure can be corrected by a subsequent transmission of the same command packet. Accordingly, the vehicle controller can neglect old and/or redundant transmissions (without iterating the vector clocks) by comparing the vector clocks (e.g., an example is shown in FIG. 3A).

Figure 3B:
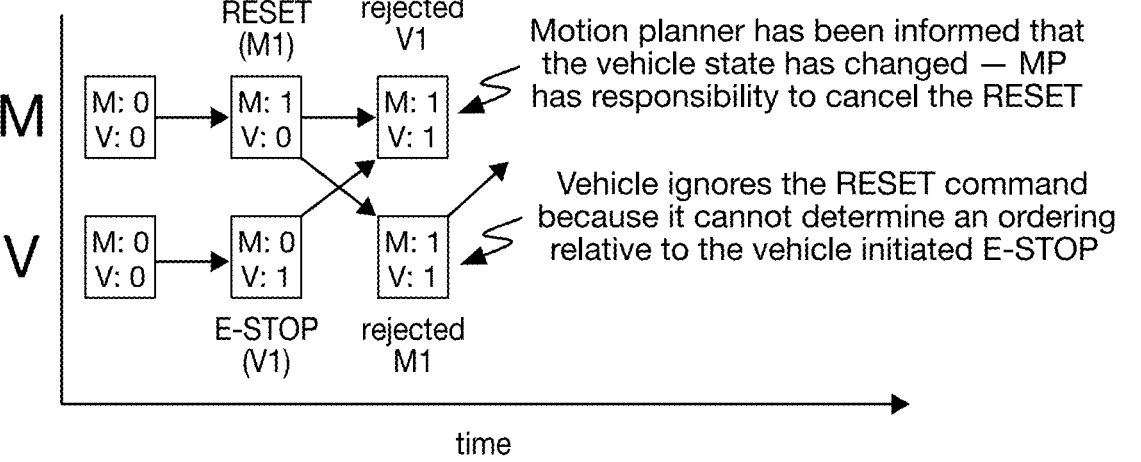
Figure 3C:
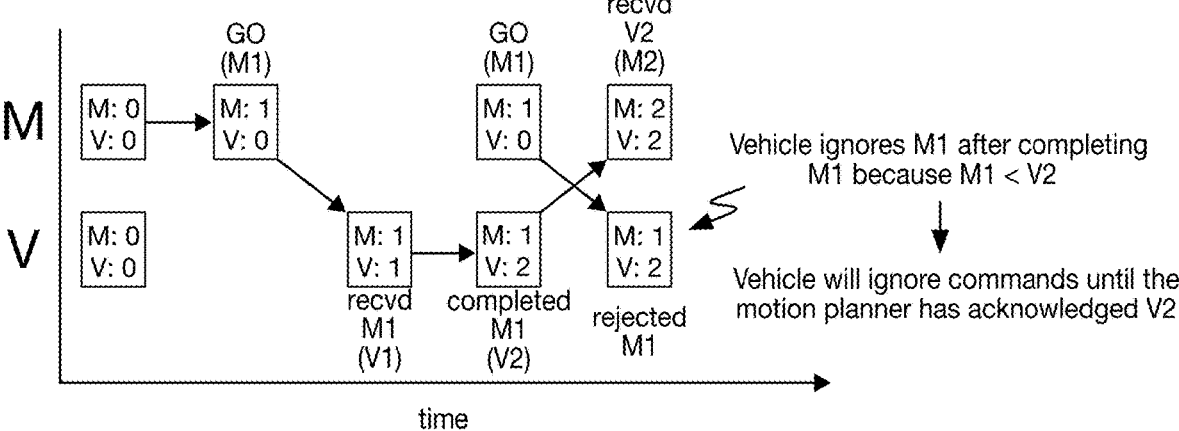
Figure 3D:
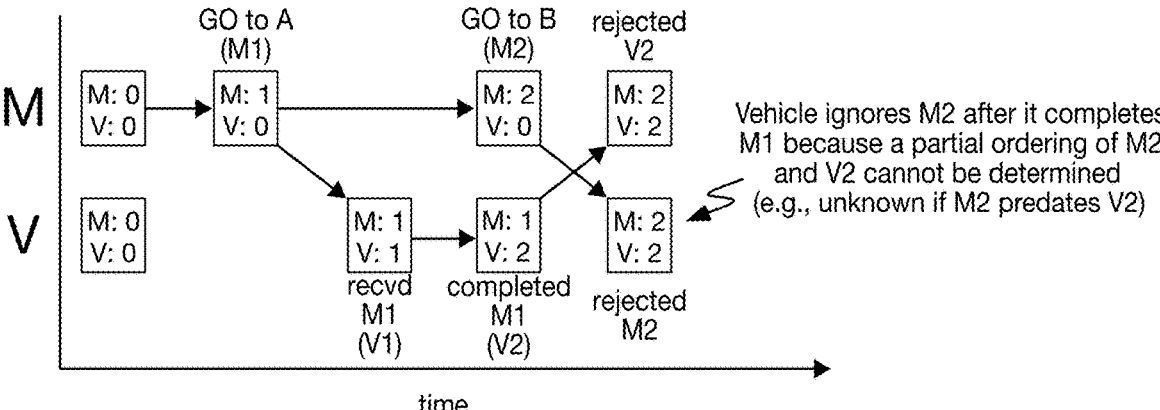
Figure 3E:
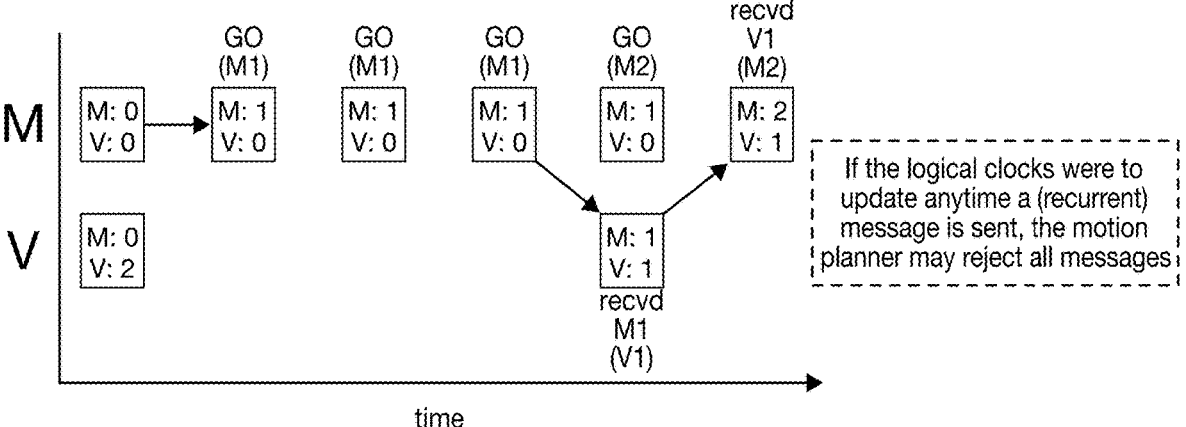
Figure 3F:
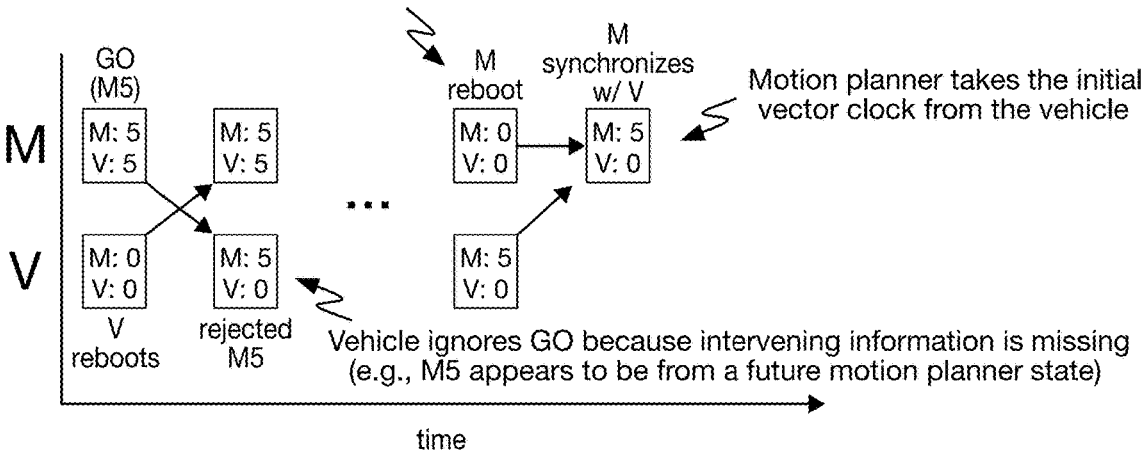

When the vehicle is disabled (and/or upon reboot, where the vehicle may enter a disabled state by default), the vehicle may cancel/ignore all previously issued commands (i.e., preceding the vector clock state at the time the vehicle is disabled). Additionally, to synchronize event ordering upon motion planner initialization (or reboot), the motion planner may initialize with the first vehicle vector clock state (e.g., an example is shown in FIG. 3F).

In one or more variants, a method for command of a rail network, comprising: receiving a respective data packet from each of a plurality of vehicles within the rail network, each respective data packet comprising a vehicle vector clock and vehicle state data; updating a corresponding vector clock for each vehicle of the plurality of vehicles based on the vehicle vector clock of the respective data packet; and for each vehicle of the plurality of vehicles, determining a command based on the vehicle state data and the corresponding vector clock; and in response to determining the command for each vehicle of the plurality of vehicles: incrementing a first logical clock of the corresponding vector clock, wherein a second logical clock of the corresponding vector clock is updated based on the vehicle vector clock; and wirelessly broadcasting a command packet comprising the command and the corresponding vector clock.

In one or more variants, corresponding vector clocks for each vehicle of the plurality of vehicles are updated at a computing system which is remote relative to the vehicles, wherein each vehicle of the plurality of vehicles is configured to autonomously execute the command for the respective vehicle responsive to establishing causality between the vehicle vector clock maintained onboard the vehicle and the corresponding vector clock at the computing system.

In one or more variants, each vehicle of the plurality is autonomously controlled based on a partial ordering of the vehicle vector clock and the corresponding vector clock. In one example, a first logical clock of the vehicle vector clock of a first vehicle is incremented responsive to receipt of the command for the first vehicle; wherein a second logical clock of the vehicle vector clock of a first vehicle is incremented responsive to execution of the command for the first vehicle; wherein the second logical clock of the vehicle vector clock of the first vehicle is further incremented responsive to an autonomous control operation.

In one or more variants, the command packet is repeatedly broadcast without incrementing the corresponding vector clock.

In one or more variants, the respective data packet from each vehicle further comprises metadata, wherein the commands are determined based on the metadata. In one example, the command packet for each vehicle comprises a set of heartbeat signals based on the metadata, wherein each vehicle of the plurality of vehicles within the rail network is autonomously constrained by the set of heartbeat signals of the command packet. In a first variation, a heartbeat signal is associated with a teleoperator video latency. In a second variation, nonexclusive with the first, a heartbeat signal is associated with a roundtrip communication latency with the vehicle.

In one or more variants, each command packet comprises a track reservation for a portion of the rail network and a map version.

In one or more variants, at a first vehicle of the plurality of vehicles: responsive to an autonomous operation of the first vehicle, incrementing the second logical clock of the vehicle vector clock; subsequently, receiving the command packet; and responsive to a determination that the second logical clock of the vehicle vector clock exceeds the second logical clock of the corresponding vector clock of the command packet, continuing to execute the autonomous operation without responding to the command packet.

In one or more variants, at a first vehicle of the plurality of vehicles: receiving the command packet; based on the command packet, updating the vehicle vector clock and command state of the vehicle; and autonomously controlling the first vehicle based on the command state.

In one or more variants, determining satisfaction of a trigger condition corresponding to a communication delay with a first vehicle, wherein updating the corresponding vector clock of a first vehicle of the plurality of vehicles based on the vehicle vector clock of the respective data packet comprises: responsive to determining satisfaction of the trigger condition, initializing the corresponding vector clock for the first vehicle using the vehicle vector clock of the respective data packet.

In one or more variants, each respective data packet comprises a command state of the respective vehicle of the plurality of vehicles.

In one or more variants, the command comprises an active command configured to modify a motion plan of the vehicle.

In one or more variants, the command for a first vehicle of the plurality of vehicles is based on an input from a remote operator.

In one or more variants, each command packet is determined based on the vehicle state of the respective vehicle of the plurality of vehicles and a set of vehicle reservations indexed relative to a track map.

In one or more variants, each command packet further comprises a set of metadata, wherein a vehicle heartbeat mechanism is associated with the set of metadata.

In one or more variants, a Positive Train Control (PTC) track database is updated based on the vehicle vector clock received from each vehicle.

2. Benefits

Variations of the technology can afford several benefits and/or advantages.

First, variations of this technology can maintain causality of vehicle command and/or control in a distributed system. Second, variations of this technology can additionally maintain command/control causality while operating with highly asynchronous (e.g., greater than 1 second asynchronization, greater than 10 second asynchronization, etc.) communication between the vehicle and the motion planner, without embedded delays (e.g., where inputs are synchronous), by using concurrent processing at a (centralized) motion planner and a 'hierarchical' vector clock scheme. For example, the motion planner can manage a separate vector clock for each vehicle to individually maintain causality with each vehicle controller. Third, variations of this technology can additionally utilize state machines (at the motion planner and/or vehicle controller) which are robust to asynchronous communication and facilitate passive recovery from vector clock discrepancies. Fourth, variations of this technology can maintain positive train control (PTC) and/or global state awareness of reservations within a distributed vehicle network to avoid vehicle collisions and/or enable more efficient use of rail network capacity. For example, variants can leverage both heartbeat signals (e.g., to manage and/or validate communication latency) and individual vector clocks (e.g., to separately ensure causality and partial ordering of events) to maintain PTC and persistent state awareness even with high latency, asynchronous communications. Fifth, variations of this technology can provide redundancy and/or fallback protections for high-criticality safety commands/controls. For instance, a vehicle can be disabled in the event of a command error and/or persistent communication failure(s) (e.g., failure to receive a heartbeat signal within a time threshold, where a latency threshold is exceeded, etc.). Sixth, variations of this technology can enable command of autonomous rail vehicles within a rail network (e.g., in compliance with railroad operating rules and/or while maintaining PTC).

However, variations of the technology can additionally or alternately provide any other suitable benefits and/or advantages.

3. System

The system 100, an example of which is shown in FIG. 1, can include a motion planner 120 and a vehicle controller 106. However, the system 100 can additionally or alternatively include any other suitable set of components. The system can function to facilitate causal command of a vehicle based on the vehicle state. Additionally, the system can function to maintain positive train control (PTC) with the distributed command architecture.

3.1 Motion Planner

The system can include or be used with a motion planner 120 (a.k.a., vehicle dispatch system) which functions to direct traversal and/or dispatch of a set of vehicles within the rail network. Additionally or alternatively, the motion planner can function to impose motion constraints on vehicles within the rail network (e.g., based on proceed authorization as granted by remote supervision and/or teleoperation instruction; imposing constraints based on track rules/requirements, such as requiring remote monitoring and/or proceed authorization along a segment of track, etc.). Additionally or alternatively, the motion planner functions to determine a set of (exclusive) track reservations which (granularly) direct vehicle operation throughout the rail network and/or implement Positive Train Control (PTC) protections (e.g., along a particular vehicle route). Additionally or alternatively, the motion planner can function to facilitate remote assistance and/or supervised autonomy via the remote operator platform, and/or any other suitable functionalities.

Figure 5:
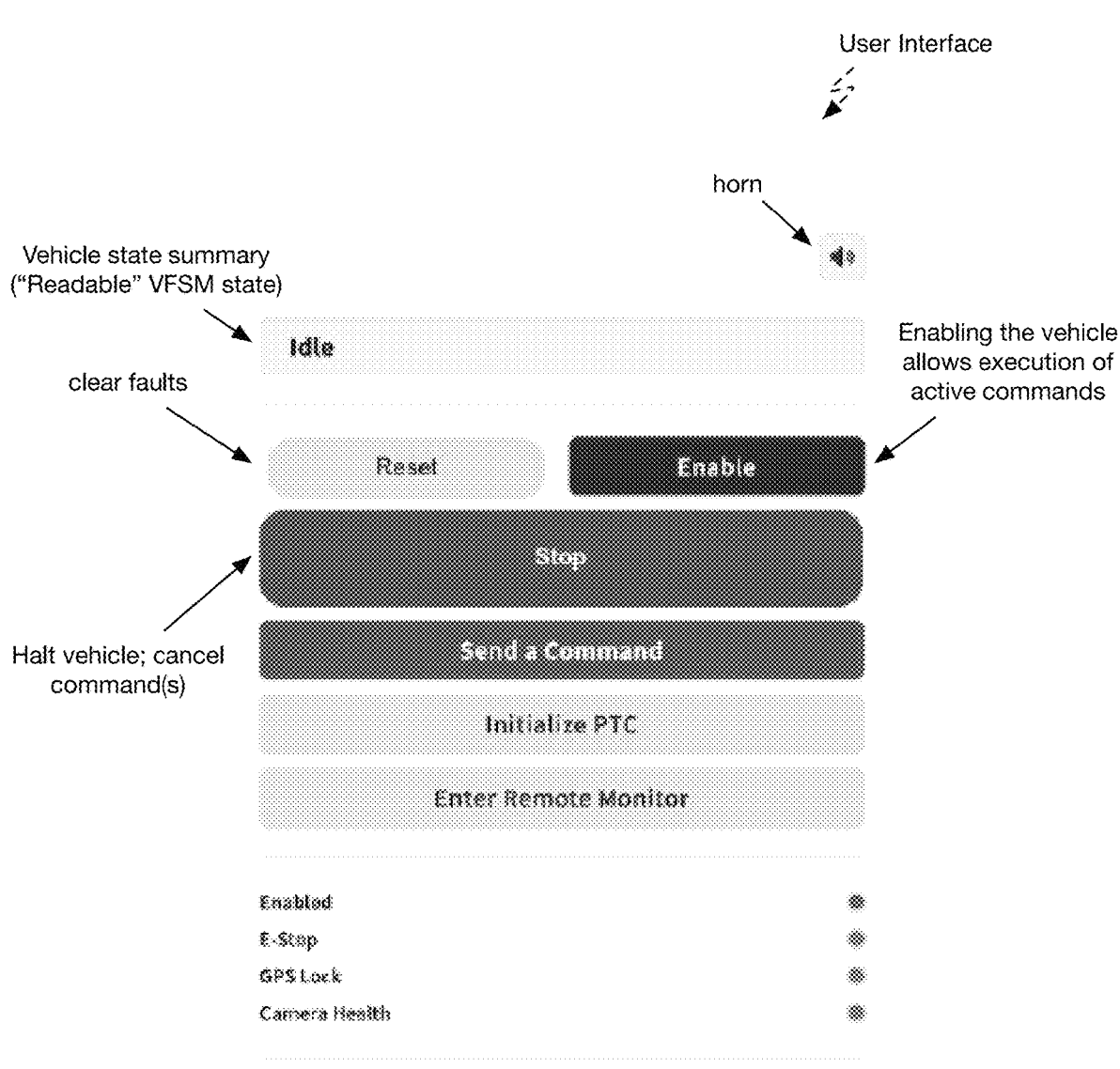
FIG. 5 is an example diagram of a user interface in a variant of the system.
Figure 6:
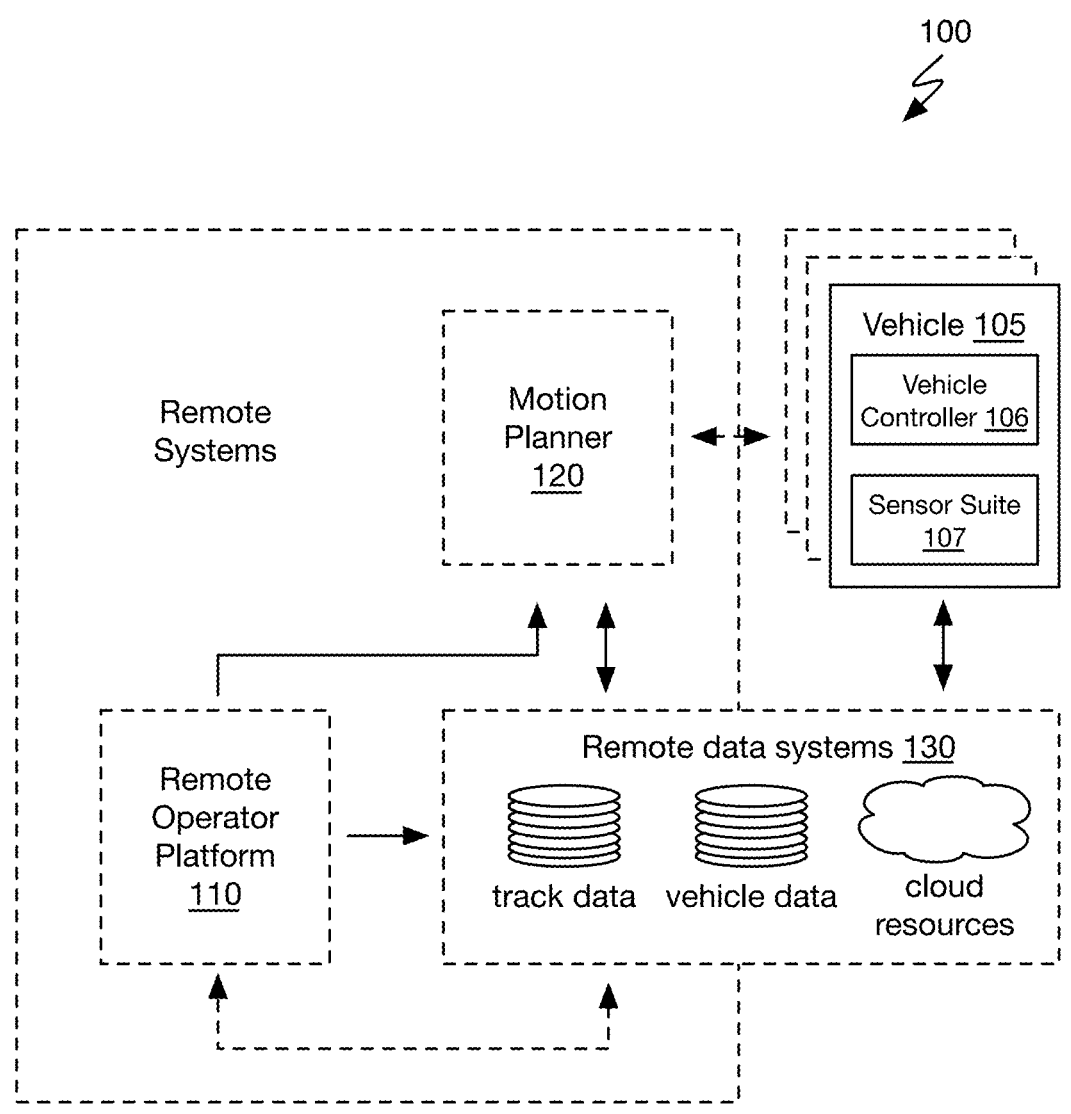
FIG. 6 is a schematic representation of a variant of the system.

In a first set of variants, the motion planner can facilitate execution of user requests (e.g., providing a series of commands to facilitate traversal of a vehicle to a user-specified location). For example, user command requests (and/or requests for vehicle state changes) can be provided via a user interface (e.g., an example is shown in FIG. 5) and/or API associated therewith.

In a second set of variants, nonexclusive with the first set, the motion planner can automatically route the vehicle(s) within the rail network, where a user (tele-operator; remote monitor) may supervise the vehicle along specific sections of track (e.g., where movement at restricted speed and/or visual control of movement is required; based on advisory bulletins, such as may be associated with ongoing construction projects surrounding the track, etc.).

In a third set of variants, nonexclusive with the first and second sets, the motion planner can facilitate fleet management of a plurality of vehicles within the rail network. For example, the motion planner can direct traversal of vehicles (e.g., platooning of rail vehicles) as described in U.S. application Ser. No. 17/732,143, filed 28 Apr. 2022, which is incorporated herein in its entirety by this reference.

Additionally or alternatively, a remote monitor may fully supervise and/or direct the vehicle via the remote operator platform 110, with or without motion planner operation (e.g., override motion planning to navigate a particular scenario; where command packets are instead provided via the remote monitor platform, etc.).

The motion planner can issue commands and/or constraints to vehicles (e.g., via wireless communication, such as an LTE connection): periodically, aperiodically, in response to a change in switch state (e.g., of an adjacent switch), in response to a track data update (e.g., change in track condition, issued bulletin, track geometry change, state change, etc.), in response to a warrant update from a railroad authority (e.g., based on and/or with any other suitable timing/frequency), in response to receipt of an updated vehicle state (e.g., from the vehicle controller), and/or with any other suitable timing/frequency. More preferably, the motion planner can issue commands/constraints with at least a predetermined minimum frequency (e.g., corresponding to a heartbeat parameter/signal). For example, the commands can be issued/updated periodically at the start of an update window (e.g., every second, every 2 seconds, every 10 seconds, every 20 seconds, etc.; where commands may be repeatedly transmitted during the window and/or prior to a subsequent update).

Figure 2A:
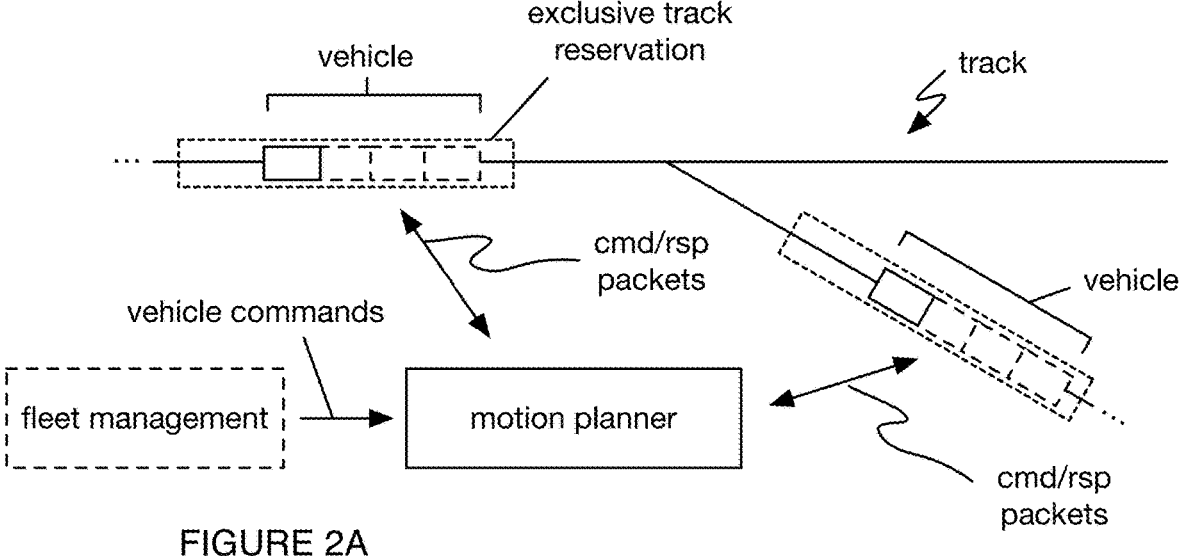
FIGS. 2A-2B are schematic illustrations of a variant of the system illustrating track reservations for multiple vehicles within a track network.
Figure 2B:
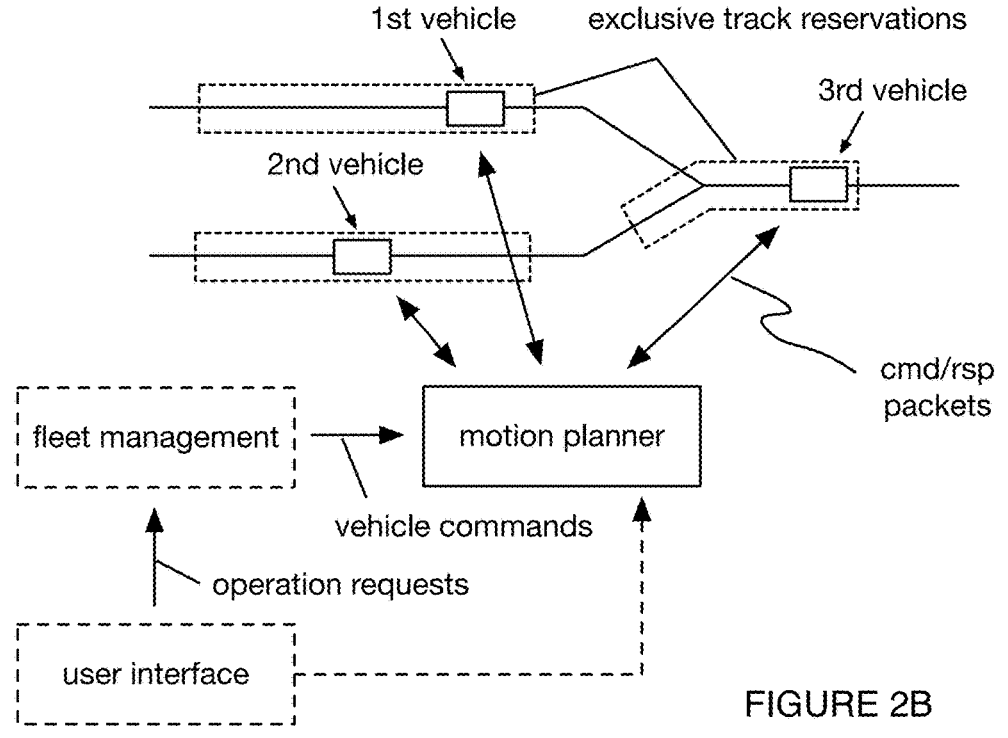

Commands can include or be associated with a (granular) region of track (e.g., positions along the rail, defined relative to a track map/geometry; examples are shown in FIGS. 2A-2B; a.k.a., exclusive track reservation) and/or operational parameters/constraints which direct vehicle routing and/or traversal within the rail network (e.g., speed, etc.; along the route and/or reserved region of track). For example, a vehicle command (e.g., active command) can include a sequence of geo-located checkpoints and/or linearized sequence of track coordinates along with a target speed profile for the vehicle to traverse the sequence. Additionally, the vehicle command(s) can include track rules, a target destination, and/or any other suitable command(s). Additionally or alternatively, track commands can include relative commands (e.g., not geo-location specific) such as: stop commands (e.g., emergency stop, controlled stop, etc.), electric charging commands, move commands (e.g., a particular distance and/or at a particular speed), platooning commands (e.g., target force applied to an adjacent vehicle, etc.), and/or any other suitable commands. Vehicle commands can be predetermined (e.g., for a train running a fixed schedule), automatically determined, autonomously determined, received from a fleet management system, manually determined by a human operator (e.g., commanding vehicle operation within a rail yard; operation requests determined and/or selected via a user interface; a remote user/tele-operator), and/or otherwise determined. Commands can be assigned/directed to a particular vehicle and/or a vehicle identifier associated with a vehicle controller of the vehicle. For example, a command can be associated with a navigation and traversal of a train along a particular route between an initial location and a destination.

Additionally or alternatively, commands can include: active commands (e.g., directing current vehicle operational objectives; wherein the vehicle may act on exactly one active command at any given point in time), passive commands (e.g., constraining future vehicle operations, facilitating state machine transitions; which may enable vector clock recovery sequences; where multiple passive commands may concurrently exist; etc.), operation-relative commands, navigation commands, railway bulletins, and/or any other suitable type(s) of command(s).

The motion planner can include a processor(s) and/or processing modules which can be: local, remote (e.g., at a remote server, at a third party server, cloud processing, etc.), centralized, distributed, and/or processing for the motion planner can be otherwise executed. In a specific example, motion planning can be regional and/or a set of regional motion planners can each govern reservation issuance over a respective track region. In variants, the motion planner and the set of vehicles (and/or vehicle controllers thereof) within the network preferably operate contemporaneously and/or synchronously, where the motion planner can issue exclusive reservations asynchronously to individual vehicles of the set (e.g., facilitating asynchronous state management of the vehicles within the network).

In some variants, the commands can include or be associated with a heartbeat parameter (and/or heartbeat mechanism/signal). For example, the commands and/or command packets (and/or metadata thereof) may serve as a heartbeat signal, where the vehicle and/or a vehicle controller thereof is limited in its ability to autonomously/independently proceed beyond a spatial/temporal window associated with the command (e.g., GPS coordinate boundaries, time period, etc.). For instance, in the event of a communication failure and/or divergence in a track condition checksum for a command (e.g., n+1 command or track reservation issued to a particular vehicle), the vehicle may be limited by the constraints of a prior (e.g., $n^{th}$) command. In absence of communication between the motion planner and the vehicle controller, the motion planner may rely on the prior (e.g., $n^{th}$) reservation and/or constraints thereof to maintain granular awareness of the location of the vehicle (e.g., which may facilitate persistent collision avoidance throughout the rail network and/or granular state estimation for the purpose to fleet management, switch state management, and/or vehicle command generation). Alternatively, the commands can include or be used in conjunction with a separate heartbeat parameter, which may be issued with the same timing/frequency as the reservations or a different timing/frequency. Additionally, in a (remote) monitoring mode, commands may be associated with a timestamp and/or vector clock associated with a particular data frame provided by the vehicle to a remote operator platform 110 (e.g., via WebRTC; within the metadata) and/or an authority grant/reservation associated therewith. Alternatively, vehicle commands can be otherwise suitably determined/issued, with any other suitable timing.

Figure 7A:
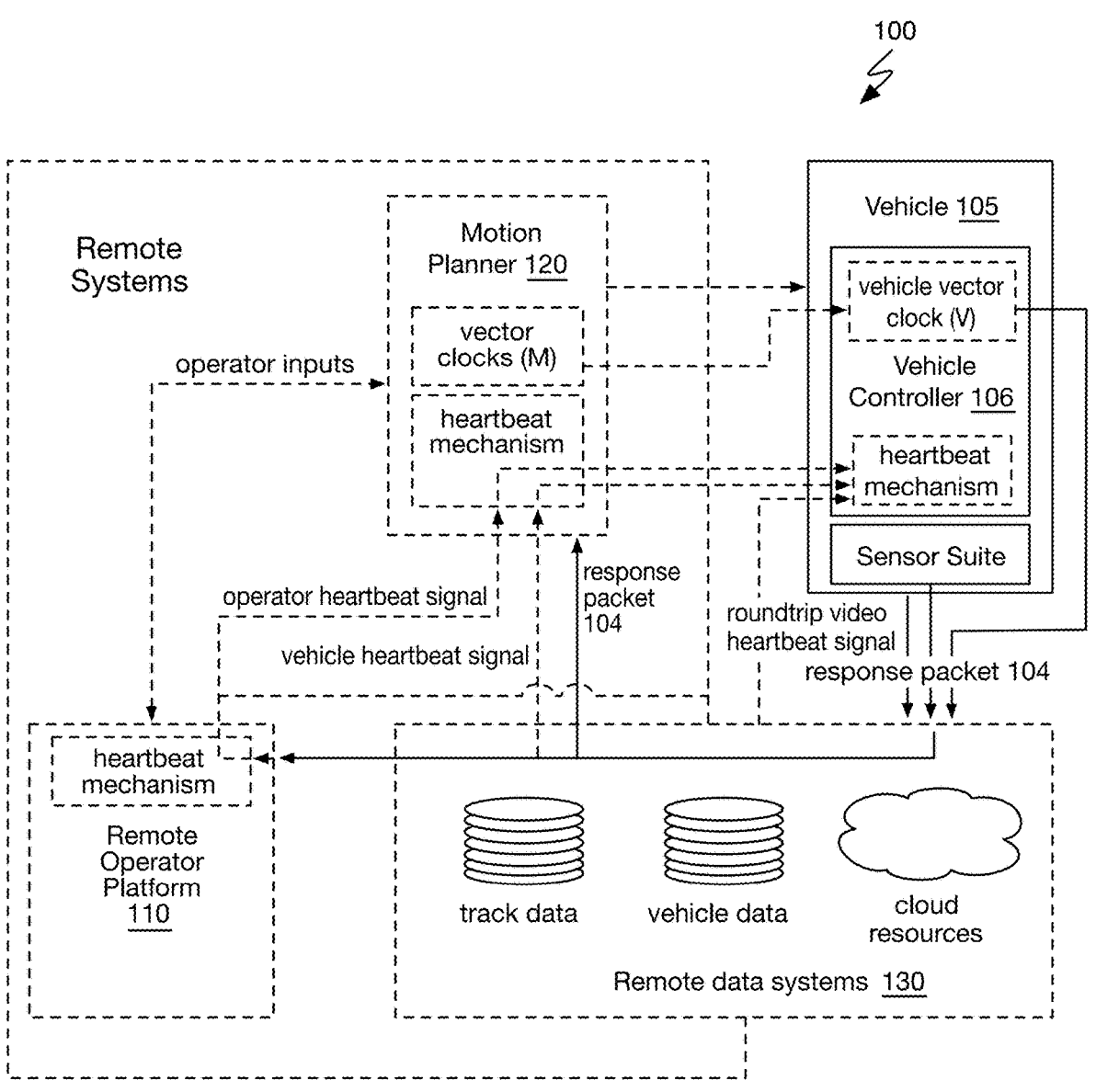
FIG. 7A is a schematic representation of a variant of the system.
Figure 7B:
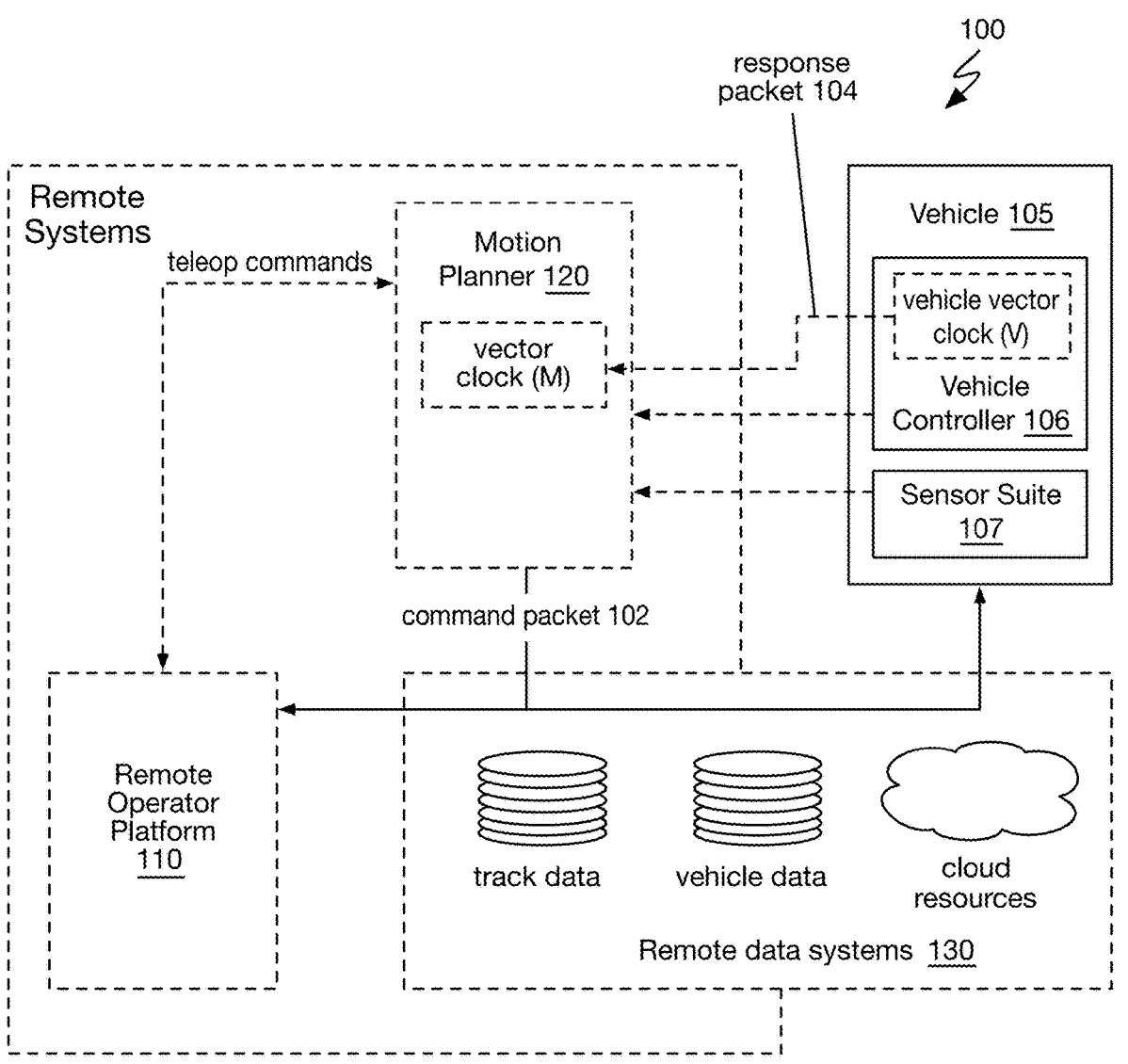
FIG. 7B is a schematic representation of a variant of the system.

In one variant, the command packet comprises a set of heartbeat signals which communicate signal latency and/or effective communication latency between various endpoints (e.g., based on metadata from vehicle response packets, examples are shown in FIGS. 7A and 7B, etc.). For example, the command packets can include a heartbeat signal(s) associated with: roundtrip teleoperator (video) latency (e.g., effective operator heartbeat latency, an example is shown in FIG. 7A), latency between a remote operation platform and the motion planner (e.g., operator heartbeat signal; an example is shown in 7A), roundtrip communication latency with the vehicle, and/or any other suitable heartbeat signal(s).

The motion planner preferably provides commands to vehicles in the form of a command packet(s) which are transmitted (wirelessly) to the vehicle. The command packet can include a command(s) for the vehicle controller, metadata (e.g., from the motion planner; a.k.a. planner metadata), a track reservation(s) (e.g., warrant, which may include a track map version), and/or any other suitable information. Additionally, command packets can optionally include manual controls (e.g., manual headlight activation/dimming, etc.), audio controls (e.g., horn signals, horn sequence command, etc.), and/or any other suitable commands (e.g., which may be active or passive). Each command packed can include: an active command (e.g., exactly one; target speed profile and a sequence of linearized track coordinates), a set of passive commands (e.g., track bulletins, etc.), planner metadata (e.g., a vector clock state; timestamp; hashed timestamp; etc.), and/or any other suitable information. For example, the planner metadata can include a vector clock state associated with the command packet (and the command(s) thereof) which is tied to the causal relationship between the vehicle and the motion planner (i.e., historical communications/iterations of the logical clock).

The command packet(s) can be transmitted: once (e.g., exactly once), repeatedly (e.g., command packets can be transmitted repeatedly while the vector clock state and/or the motion plan remains constant; a motion plan to traverse at a constant speed along a mainline track may be repeatedly provided for ten minutes without updates/modifications; etc.), periodically (e.g., with at least a minimum heartbeat interval), in response to satisfaction of a trigger condition (e.g., vector clock state change; command update, such as a change in the active command; recovery sequence trigger; etc.), and/or with any other suitable timing/frequency. As an illustrative example, a command packet can be repeatedly (re-)broadcasted to the vehicle without an update to the vector clock (e.g., an example is shown in FIG. 3E), which may be particularly advantageous where communication latency is high and/or transmission reliability is low (e.g., within a tunnel, in a rural area with poor wireless connectivity, etc.). However, the motion planner can provide any other suitable command packet(s) with any other suitable timing/frequency.

However, the motion planner(s) and/or vehicle dispatch systems can otherwise facilitate motion planning, vehicle dispatch, and/or vehicle routing.

3.2 Vehicle

A vehicle(s) 105 can function to traverse within a rail network according to commands issued by the motion planner 120 via command packets 102. The vehicles can include a sensor suite 107 and a vehicle controller 106, and/or any other suitable elements. The sensor suite functions to collect sensor data (e.g., localization, imaging, etc.), with which the vehicle controller can estimate the vehicle state and determine vehicle control (e.g., based on commands issued by a motion planner and/or proceed authority from a remote operator). However, the vehicle can include any other suitable elements and/or can be otherwise configured. Additionally or alternatively, the system and/or operator platform thereof can be configured to facilitate operation of a remote vehicle and/or can be used with any other suitable vehicle(s).

In variants, the vehicle(s) can be as described in one or more of: U.S. application Ser. No. 17/694,499, filed 14 Mar. 2022, titled "ELECTRIC RAIL VEHICLE," U.S. application Ser. No. 17/335,732, filed 1 Jun. 2021, titled "ELECTRIC RAIL VEHICLE," each of which is incorporated herein in its entirety by this reference.

In variants, the vehicle controller can facilitate vehicle control and/or platooning in accordance with the system and/or methods as described in U.S. application Ser. No. 17/732,143, filed Apr. 28, 2022, which is incorporated herein in its entirety by this reference. In a specific example, the vehicle controller can be the controller of a leading vehicle of a leading car of a platoon (e.g., wherein a remainder of vehicles and/or cars of the platoon are controlled based on the operation of the leading car).

The sensor suite 107 functions to monitor vehicle state parameters which can be used for vehicle control (e.g., autonomous vehicle control). The sensor suite can include: internal sensors (e.g., force sensors, accelerometers, gyroscopes, IMU, INS, temperature, voltage/current sensors, etc.), external antennas (e.g., GPS, cellular, Bluetooth, Wi-Fi, Near Field Communication, etc.), rail sensors (e.g., wheel encoders, cameras, temperature sensors, voltage/current sensors, accelerometers, etc.), payload sensors (e.g., force sensors/switches, cameras, lights, accelerometers, NFC sensors, etc.), environmental sensors (e.g., cameras, temperature, wind speed/direction, accelerometers), guidance sensors (e.g., load cells, bumper contact switches, strain sensors, lights, horn, sonar, lidar, radar, cameras, etc.), and/or any other suitable sensors. The sensors can include one or more: Radar sensors, LIDAR sensors, sonar sensors, cameras, spatial sensors, location sensors, force sensors, on-board diagnostic sensors such as vehicle mechanism sensors, audio sensors, barometers, light sensors, temperature sensors, current sensors, air flow meters, voltmeters, contact sensors, proximity sensors, vibration sensors, ultrasound sensors, electrical sensors, and/or any other suitable sensors. However, the electric vehicle can include any other suitable sensors.

Sensor data from the vehicle sensor suite can be used (e.g., by the vehicle controller) for vehicle state estimation, autonomous collision avoidance (e.g., perception based emergency braking), and/or any other suitable vehicle control functionalities. Additionally or alternatively, the sensor data and/or vehicle state estimate generated therefrom can be used to facilitate remote command/routing of the vehicle (e.g., by a human, etc.), and/or can be otherwise used.

However, the vehicle can include any other suitable set of sensors.

Each vehicle controller 106 functions to control a vehicle within the rail network to facilitate operation of the vehicle based on the vehicle commands (e.g., in accordance with the command architecture and/or command state machine). More preferably, the vehicle controller functions to facilitate autonomous operation of the vehicle within a reserved region of track associated with commands issued by the motion planner, based on the constraints and/or the operational parameters thereof (e.g., limiting motion based on the bounds of a track reservation; heartbeat provision; etc.). As an example, the vehicle controller may retain agency to stop based on perceived surroundings or internal diagnostics, but the movement/control of the vehicle controller may be limited by the (dynamic) constraints of the reservation, heartbeat signal provision, and/or (updated) commands issued by the motion planner. For instance, commands issued by the motion planner may constrain: maximum speed, maximum proceed distance (e.g., movement boundaries), autonomy level (e.g., full autonomy, partial autonomy, human-in-the-loop control, etc.), direction of operation (e.g., unidirectional operation, bidirectional operation, etc.), period of command validity (e.g., where the vehicle must stop in absence of a currently valid command), and/or can otherwise constrain vehicle operation.

The vehicle controller preferably determines a vehicle state (a.k.a., vehicle status) and communicates the vehicle state to the motion planner (e.g., which can be used for validation, verification, and/or subsequent reservation determination). The vehicle state determined by the vehicle controller can include: location data (e.g., GPS location; track coordinate position relative to a track map; etc.), motion data (e.g., speed estimation, heading, etc.), timing data (e.g., vehicle clock timestamp, etc.), battery characteristics (e.g., state of charge, state of health, state of power, etc.), diagnostic parameters (e.g., battery characteristics, powertrain characteristics, sensor characteristics, etc.), perception performance (e.g., heading distance, etc.), brake performance estimates (e.g., max stopping distance), environmental representations (e.g., classification of objects/obstacles in the environment), and/or any other suitable vehicle state parameters/estimates.

Additionally, the vehicle controller can provide loop closure communicating (to the motion planner) confirmation of updates to reservation assignment (e.g., confirming operation under an n+1 reservation), switch position, track map updates (e.g., track condition parameter; via checksum), heartbeat parameters (e.g., central system connection parameters, warrant update parameters, etc.), command state of the vehicle (i.e., the command(s) the vehicle is acting upon), and/or any other suitable information. Additionally, where the vehicle is being remotely monitored and/or wherein commands are determined at least in part based on vehicle sensors and/or vehicle state feedback, the vehicle can additionally provide vehicle sensor data (e.g., camera images, WebRTC feed, etc.) and/or vehicle state information to the motion planner. In variants, if either the vehicle controller or the motion planner is unable to (asynchronously) validate communications and/or coordination relative to the track, the vehicle controller can control the vehicle to stop (e.g., within the existing reservation).

In a first example, if the vehicle controller does not receive a heartbeat signal and/or an updated command/reservation (e.g., in the case of a communication failure, for example), the vehicle controller can stop the vehicle within the reserved region of track associated with a prior command (e.g., for which the vehicle has already received proceed authority). Similarly, if the motion planner is unable to validate the communications from the vehicle controller (and/or establish causality for future proceed authorization), the motion planner can directly command the vehicle to stop (e.g., via wireless communications; commanding the vehicle to stop and/or disabling the vehicle) and/or indirectly control the vehicle to stop (e.g., restricting the vehicle by not issuing a superseding command/reservation which may be required for the vehicle to proceed; in accordance with the command architecture).

Additionally or alternatively, the vehicle controller can function to distribute power and/or communications onboard the vehicle to affect vehicle control. The vehicle controller can additionally or alternatively function to implement autonomous navigation commands, teleoperation commands (e.g., received from a remote teleoperator), autonomous vehicle control (e.g., based on the set of operational parameters), and/or any other vehicle control. The controller is preferably onboard the vehicle (e.g., mounted to a vehicle chassis, etc.), but can alternatively be remote from the vehicle. The controller can be centralized (e.g., packaged within a single module) or distributed (e.g., across multiple compute nodes, packaged within multiple compute modules, etc.). The controller can receive sensory inputs/measurements from the sensor suite, which can be used to determine a vehicle state, dynamically control the vehicle, manage the batteries, and/or control the electric powertrain. The controller can include a battery management system which functions to monitor the state of the battery. The state of the battery can include: state of charge (SoC), state of health (SoH), state of power (SoP), state of safety (SoS), temperature (e.g., of the battery or a set of cells therein, of a working fluid, a temperature distribution of battery cells, etc.), and/or any other suitable characteristics. The battery management system can also function to control the charge and/or discharge of the battery. However, the controller can include any other suitable BMS. The controller can include one or more motor controllers which function to condition power from the battery to be supplied to a motor and/or to control electrical propulsion and/or dynamic (regenerative) braking at the motor. There can be a single motor controller associated with the vehicle, one motor controller per motor, and/or any other suitable number of motor controllers. However, the controller can include any other suitable motor controllers. In variants, the controller can function to facilitate vehicle transit and/or powertrain control as described in U.S. application Ser. No. 17/335,732, filed Jun. 1, 2021, which is incorporated herein in its entirety by this reference. In variants, the controller can control a platoon of electric vehicle(s) individually or may be used to control vehicles in a pairwise manner (e.g., via V2V communications, etc.).

In variants, a vehicle controller can include: a speed controller, velocity controller, PID controller, MPC controller, nonlinear controller, feedback controller, feedforward controller, and/or can implement any other suitable control schemes or any combination/permutation thereof.

However, the system can include any other suitable vehicle controller and/or operate in conjunction with any other suitable vehicle(s) or vehicle control scheme(s). Additionally or alternatively, the vehicle and/or motion planner can otherwise facilitate positive train control (PTC) via any suitable command/control paradigm.

The vehicle controller 106 preferably communicates with the motion planner in the form of response packets 104, which can include: metadata (e.g., controller metadata; vehicle vector clock state), vehicle state data, a command state, and/or any other suitable information. For example, the vehicle and/or vehicle controller thereof can be configured to transmit vehicle data to the motion planner and/or other external systems (e.g., remote data systems), which can include: command state (e.g., current state of vehicle control state machine; command(s) which the vehicle is acting upon; 'moving under motion plan,' 'stopped awaiting proceed authorization,' 'proceeding with remote monitoring under a speed restriction,' 'inactive due to vehicle emergency and awaiting intervention,' etc.), sensor data (e.g., camera image frames, RGB video feed, etc.), vehicle state data (e.g., speed or velocity, localization data, track coordinates, etc.), timing data (e.g., GPS clock timestamp, etc.), vector clock state (e.g., vehicle logical clock state, motion planner logical clock state, etc.), perception data (e.g., annotated image frames; object detection/tracking data, etc.), and/or any other suitable data. Data can be offloaded with any suitable timing/frequency (e.g., event driven, periodically, based on operational mode, based on the track rules, etc.) and/or data format(s).

However, the vehicle(s) can include any other suitable vehicle controller(s).

However, the system can include any other suitable components.

3.3 Command Architecture

Figure 4:
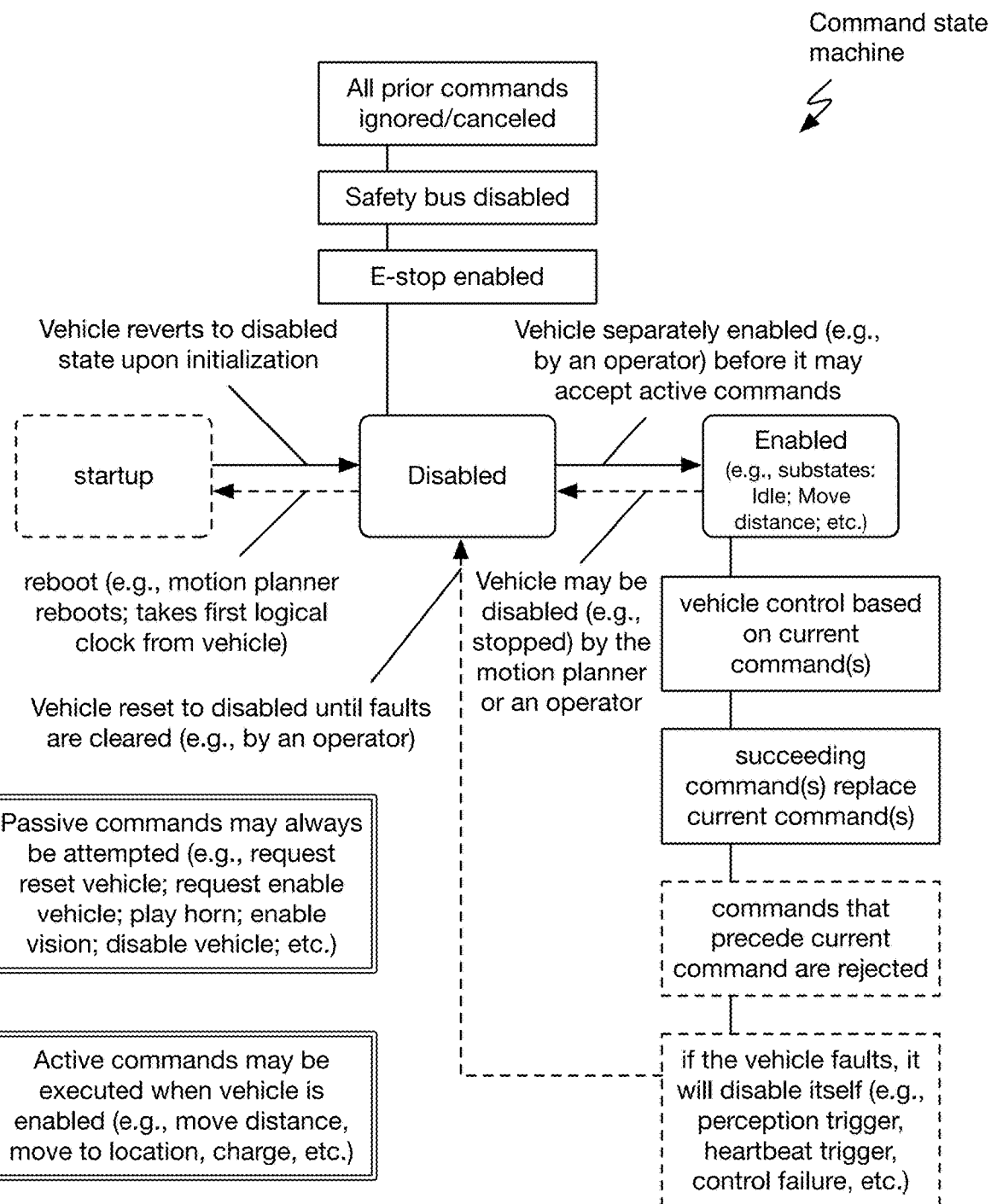
FIG. 4 is a diagrammatic example of a command state machine in one or more variants of the system.

The vehicle controller(s) 106 preferably executes commands in accordance with a command architecture, which can be implemented with a virtual finite-state machine (equivalently referenced herein as the "command state machine") to ensure causality and/or to implement functional safety constraints. The vehicle controller processes and/or executes commands according to a command state of the command state machine (i.e., a VFSM). The command state machine (e.g., an example is shown in FIG. 4) can implement a set of rules/constraints which limit vehicle operation and/or command state changes based on command packets (and/or commands) from the motion planner.

The command architecture can utilize vector clocks to evaluate timing/causality of communications (i.e., command packets and response packets) between the vehicle controller(s) and the motion planner. The motion planner can include/maintain a set of vector clocks ($M_A \ldots M_n$), each corresponding to a specific vehicle (and/or vehicle controller) within the network. Likewise, each vehicle controller maintains a respective (vehicle) vector clock, wherein the comparison between the vehicle vector clock (e.g., $V_A$) and the corresponding motion planner vector clock ($M_A$) can be evaluated to establish partial ordering of events (e.g., namely, command issuance and execution) and/or command state machine transitions. Accordingly, the command architecture may utilize a 'hierarchy' of vector clocks, where partial ordering of events is managed independently for each vehicle (and/or vehicle controller), where final decision agency is pushed to the edge (e.g., edge compute at vehicle based on the command state machine of the vehicle and/or autonomous decisions at the vehicle; where the vehicle retains agency to stop) and motion/reservations throughout network is/are (centrally) managed at the motion planner (e.g., deconflicting vehicles, collision avoidance, etc.; with no notion of cross-dependency or partial-ordering of distributed communications between vehicles). Additionally, the motion planner may deterministically compute absolute (temporal) ordering of command packet transmission and/or command issuance for the plurality of vehicles (i.e., 'fleet' of vehicles) to maintain a persistent 'belief state' for track reservations and/or positive train control (PTC) throughout the network (e.g., on a per-vehicle basis).

In a first example, the metadata of the response packet can include a vehicle vector clock state which iterates a first logical clock based on receipt (and acknowledgement) of incoming command packets and a second logical clock based on logic updates at the vehicle (e.g., command state logic updates, etc.).

In a second example, nonexclusive with the first, the metadata of the command packet can include a motion planner vector clock state which iterates a first logical clock iterating transmission of (unique) command packets and a second logical clock indexing the most recent logic update received from the vehicle (i.e., vehicle logical clock state of most recent response packet).

Examples of vector clock updates between a vehicle and motion planner, under one variant of the command architecture, are illustrated in FIGS. 3A-3F.

However, vector clocks can be otherwise used and/or otherwise implemented to establish partial ordering of any other suitable set(s) of events.

The vehicle controller preferably operates based on the command packets 102 (and/or commands thereof) based on the partial ordering of events/communications according to any suitable set of rules, heuristics, criteria, decision trees, functional safety requirements, and/or other decision logic, such as may be implemented as a part of a virtual finite-state machine (VFSM) or otherwise.

In one set of variants (e.g., an example is shown in FIG. 4), the command state machine can include a 'disabled' state and an 'enabled' state, where the vehicle controller may only accept an active command(s) from the motion planner in the enabled state. In one variant (e.g., in an enabled state), the vehicle controller may ignore commands and/or command packet(s) received out-of-order (e.g., an example is shown in FIG. 3A; a second example is shown in FIG. 3C), for which causality cannot be established (e.g., where the timing of command issuance relative to a vehicle command state change is ambiguous; an example is shown in FIG. 3B; a second example is shown in FIG. 3D), and/or may otherwise handle command packet(s) according to any other suitable command architecture(s). In a second variant, nonexclusive with the first, the vehicle controller may automatically disable the safety bus and/or enable an emergency stop in a disabled state.

3.4 Rules

The system can impose a set of command architecture rules, which can be implemented at the vehicle controller(s) and/or motion planner (e.g., independently at either end-point; collectively; redundantly at both endpoints; etc.). In an example, the set of rules can include any one or more of the following:

1) Upon reboot/initialization, the motion planner accepts the first logical clock state from the vehicle (synchronizing the vector clocks).
2) The vehicle can default to disabled state upon initialization.
3) In the disabled state: all prior commands are canceled (i.e., vehicle will ignore all preceding commands preceding the vector clock state upon entering the disabled state).
4) From a disabled state, the vehicle must be enabled (e.g., by a user, via the remote operator platform) before it may accept active commands.
5) Passive commands may always be attempted (e.g., request reset vehicle; request enable vehicle; play horn; enable vision; disable vehicle; etc.).
6) Active commands can be executed when the vehicle is enabled (e.g., move distance, move to location, charge, etc.).

7) Vehicle control is based on current command(s) and/or current command state.
8) Succeeding command(s) (e.g., where the vector clock state of the command packet succeeds the vehicle vector clock state) replace current command(s).
9) (Active) commands that precede current command (e.g., where the vector clock state of the command packet precedes the vehicle vector clock state) are rejected.
10) From an enabled state, the vehicle may be disabled (stopped) by the motion planner or a user, overriding the active command and reverting the vehicle to a disabled state.
11) If the vehicle faults (e.g., by perception trigger, heartbeat trigger, control failure, hardware fault, etc.), it will disable itself.
12) The vehicle can be reset (e.g., by a user; locally and/or by the remote operator platform) to clear faults (e.g., before the vehicle and/or vehicle controller may accept active commands; vehicle remains disabled while faults persist).

However, any other suitable set of rules/constraints can be imposed, and/or any other suitable command architecture can be implemented with the system.

4. Remote Operator Platform

The remote operator platform 110 functions to facilitate remote monitoring and/or command of the vehicle in one or more operational modes.

The remote operator platform can be configured to operate in a monitoring mode, in which a remote (tele-) operator can grant proceed authority to the vehicle to traverse within the line-of-sight of the remote operator, while retaining agency to revoke proceed authority, stop the vehicle, and/or otherwise intervene in response to emergent scenarios. Proceed authority can be granted actively (e.g., manual adjustment of line of sight and/or proceed authorization) and/or passively (e.g., supervision of video feed). Proceed authority is preferably associated with individual image frames (e.g., received from the vehicle, with some inherent latency) and granted as a distance relative to the position of the vehicle associated with the image frame. The distance can be defined relative to the track and/or a predetermined map thereof (e.g., stored track map; position and/or distance relative to a linearized segment of track), a GPS coordinate position, and/or any other suitable positional reference(s). Additionally or alternatively, the proceed authority grant can be associated with a (motion relative) time-constraint, such as the minimum time required for the vehicle to traverse the authorized distance along the track while operating based on a speed constraint (e.g., authorized speed; speed limit for the track region; etc.). Proceed authority can be passively granted (e.g., based on a stable position of an adjustable line of sight; based on an input position of a slider, scroll wheel, or other input mechanism), but can additionally or alternatively be granted based on a continuous/periodic input from an input device (i.e., position of a slider; click to proceed; etc.), and/or other suitable input.

In the monitoring mode, proceed authority is preferably granted based on the visibility and/or line of sight of the remote operator monitoring the incoming data frames. The remote operator preferably maintains and/or adjusts a line-of-sight indicator for incoming image frames (e.g., in real-time) at the remote operator platform. For example, the line-of-sight indicator can be an arrow overlayed with the track, a line/boundary, and/or any other suitable indicator.

For instance, the remote operator can adjust the line-of-sight in an augmented image overlay and/or relative to track map coordinates along a track map (e.g., alongside route waypoints, control points, speed restriction boundaries, switch positions, track authority boundaries, etc.). However, the line-of-sight can be otherwise suitably adjusted and/or displayed to a remote operator.

The line-of-sight indicator is preferably placed in the virtual scene overlaid on the image by an augmented reality (AR) display mechanism, allowing adjustments by the operator and/or constraints on the track, but can be otherwise suitably indicated in association with the image frame(s) and/or can be otherwise suitably provided. The adjustments to the indicator are preferably manual, but can additionally be constrained based on the ambient lighting conditions, time-of-day, vehicle state (e.g., speed), track data (e.g., accessed from a remote data system; periodically, in real time, for each incoming data frame, etc.), track rules, operating rules/restrictions, motion planner rules/constraints (e.g., where the motion planner may stop the vehicle and/or restrict operation of the vehicle as it approaches a misaligned switch/junction, etc.), and/or otherwise adjusted/modified. Proceed authorization can then be automatically granted for individual data/image frames based on the line-of-sight indicator provided for the frame. Accordingly, the line-of-sight may automatically direct the proceed authorization and corresponding stopping distance (e.g., in absence of intervening communication), which can additionally be displayed (e.g., overlaid with a stopping distance and/or proceed authorization indicator).

In a first variant, the line-of-sight indicator can be mapped to a distance based on the pixel coordinates of the indicator (e.g., pixel height, for a straight track, tip of arrow, etc.) such as using a lookup table (e.g., predetermined based on the horizon line and/or mounting position of the camera; based on the visual horizon reference). In a second variant, the line-of-sight indicator can be used to estimate the visibility down the track based on a set of predetermined rules or heuristics. In a third variant, the line-of-sight indicator can be used to estimate the visibility relative to the pixel width of the track. In a fourth variant, the line-of-sight distance can be estimated using a pinhole projection model. However, line-of-sight distance can be otherwise determined for each image frame.

In the monitoring mode, proceed authorization is preferably granted within the line-of-sight according to a predetermined set of rules/heuristics. For example, proceed authorization can be half the line-of-sight distance (e.g., where stopping within half line-of-sight may be a general operational constraint of the vehicle). Additionally, proceed authorization may optionally be adjusted/reduced to factor in communication latency and/or a reaction time 'buffer' (e.g., building in time for a remote operator to react to distant objects within line of sight and/or changing conditions down the track). For example, the authorized distance may be automatically reduced by a static/dynamic offset (e.g., latency multiplied by the vehicle speed, yielding the maximum distance that the vehicle may traverse between transmission of a data frame and the corresponding command/authorization).

Proceed authorization is preferably granted within a command and/or heartbeat signal (e.g., with the same periodicity of frame transmission; preferably in real time or substantially real time) and/or can be granted separately from motion planner commands (e.g., high-level 'point to point' instructions, etc.). For example, proceed authority can be substantially periodic (e.g., with the same transmission frequency as the video feed), but can alternatively be aperiodic (e.g., based on manual inputs, dependent on attention monitoring trigger events, etc.), and/or can be provided with any other suitable frequency/timing.

Additionally, along with proceed authorization, the remote operator can command and/or constrain vehicle speed. For example, the remote operator can directly select/adjust the speed using a dedicated input mechanism (e.g., a throttle). Alternatively, the remote operator can indirectly adjust the vehicle speed based on the visibility, wherein the vehicle speed may be reduced based on the latency and distance of proceed authorization (i.e., stopping distance). Further constraints can be predefined, such as the maximum roundtrip latency which the system may tolerate before commanding the vehicle to stop and/or the maximum vehicle speed within a track region with movement at restricted speed (e.g., 20 miles per hour; which may be governed by track rules and/or operating rules of the railroad, such as GCOR).

In a first set of variants, the remote operator platform can include a computing system, a display, a set of input devices, and/or any other suitable hardware components. The computing system functions to enable the communication and data processing to facilitate remote monitoring and/or teleoperation by way of the set of input devices and display. The remote operator platform and/or computing system thereof are preferably remote (relative to the vehicle), and can be communicatively coupled to the vehicle and/or motion planner via any suitable communication channels and/or protocols. For example, the remote operator platform can be coupled to the vehicle via an API, and communicatively coupled to the motion planner (e.g., by a separate API, integrated within a remote computing system/network, etc.). However, the remote operator platform can include any other suitable hardware/infrastructure components and/or can otherwise interface with any other suitable hardware devices (e.g., authorized user device/tablet executing a Web application, etc.).

However, the remote operator platform can be otherwise configured.

The set of input devices function to facilitate command verification (e.g., actively, passively), user adjustment of a line-of-sight indicator, and/or command determination (e.g., issuance of a proceed command to move past a potential hazard; issuance of a 'STOP' command; etc.). The set of input devices can be wired, wireless, separate from the display (e.g., keyboard mouse, joystick, inceptor, etc.), integrated with a touchscreen display, and/or can be otherwise implemented. In a specific example, the set of input devices can include a low-latency, wired mouse (e.g., performance gaming mouse; high sensitivity/DPI; <1 ms input lag). The set of input devices can include binary input mechanisms (e.g., push buttons, point-and-click, etc.; emergency stop button), analog inputs (e.g., scroll wheels, sliders, etc.; which may facilitate highly/infinitely variable continuum of inputs), touchscreen inputs, and/or any other suitable input mechanisms. However, the remote operator platform can include any other suitable input devices.

The remote operator platform can include a display, which functions to display image frames (and/or a real-time video feed) from the vehicle to a remote user/tele-operator, which can be used to facilitate vehicle monitoring and/or command validation. Additionally, the remote operator platform (and/or display thereof) can continuously and/or selectively display frame metadata (e.g., communication latency[ies], data timestamp, etc.), vehicle state data (e.g., speed, battery state of charge, location relative to a track map, obstacle detection/tracking data, etc.), command information (e.g., proceed authorization relative to track map; track-relative position and/or GPS location of vehicle; target destination; etc.), and/or any other suitable parameters.

Additionally, in variants (e.g., for track regions where visual control of movement is required), the display preferably provides an image overlay indicating a line-of-sight visualization (such as an arrow, line indicator, etc.) and/or stopping distance (e.g., proceed authorization) visualization. The line-of-sight distance is preferably user adjustable (e.g., with the input devices and/or input mechanisms thereof, such as a scroll wheel, slider, etc.), which the user may actively adjust based on their real-time observations of incoming image frames, wherein the proceed authorization (and/or stopping distance associated therewith) is automatically determined at the remote operator platform based on the line-of-sight distance. For example, the proceed authorization may be based on both line-of-sight distance and the vehicle kinematics/dynamics, such that the vehicle retains the ability to stop within some fraction of the line-of-sight (e.g., less than half of the line of sight distance)

In one set of variants, the system (e.g., remote operator platform) can use geospatial track data to render an AR-style overlay of track features and movement indicators.

In an illustrative example, dashed lines can represent the intended vehicle path in an AR-style overlay, which transition to solid lines (along the sides of the track) once the user has indicated the vehicle can proceed that distance down the track. A first line segment may represent the user's (confirmed) line of sight. The second line segment represents the distance the vehicle will actually travel (½ the line of sight) once the user confirms the movement target. The lines alongside the track can be represented in a data format similar to that representing the track map and the vehicle's current reservation/warrant (e.g., GeoJson, geocsv, etc.). The remote operator platform frontend can utilize geospatial calculations to render the visual indicators for the line of sight and travel distance at real latitude and longitude points, calculated in relation to the front of the vehicle, which may be used to authorize movement over the (real) sections of track. The overlay can be rendered to the screen/display using a 3D rendering library which receives the geospatial coordinates and projects them on the screen (e.g., with a first-person perspective). To improve accuracy with the video screen, the projection matrix and extrinsic matrix representing the mounting pose relative to a fixed position on the vehicle can be configured to represent a perspective with the same position and parameters as the vehicle's camera(s). The GPS position of the vehicle can be included in each video frame streamed to the UI, keeping the position in sync.

The display can optionally indicate and/or otherwise enable adjustments to a visual horizon reference (e.g., pre-calibrated based on the mounting position of the camera relative to the vehicle). The visual horizon reference can be static/invariant, pre-calibrated for the camera/vehicle (e.g., based on the mounting position of the camera), predetermined, dynamically determined/adjusted, manually adjustable, and/or otherwise defined. For example, the visual horizon reference can be defined at a pre-calibrated pixel height for the camera, but can additionally be manually adjustable by a user. As an illustrative example, the visual horizon can be used as a reference to estimate distances associated with user monitoring/validation (e.g., distance estimation as a function of pixel coordinates relative to the horizon; where observable distances can be defined/estimated relative to the horizon reference). Additionally or alternatively, distance along the track can be estimated relative to the track width at a particular pixel height (e.g., where the width between rails is a known constant for a particular rail vehicle), and/or can be otherwise suitably defined. Additionally or alternatively, the visual horizon reference may limit the maximum line-of-sight distance a user may select (e.g., it may not be feasible for a user to verify a lack of hazards and/or grant proceed authority within a band of the pixels approaching the horizon line, which may be many miles away; where pixels adjacent to the horizon line, in absence of terrain features, may correspond to the limit approaching infinite distance in the visual field). Accordingly, the user may be restricted from selecting pixels within a predetermined pixel band of the visual horizon, and/or the line-of-sight may be otherwise constrained.

Additionally or alternatively, in some variants, a visual horizon reference may not be required and/or may not be utilized. Instead, the track data, vehicle GPS position, and physical location of the cameras on the vehicle can be used to calculate the pixel coordinates of visual indicators for the video overlay.

However, the system can be otherwise configured.

The remote operator platform can optionally include an attention monitoring system and/or functionality. For instance, user inattentiveness may preclude a user from observing some hazards (particularly distant hazards which are still within the line-of-sight), and thus attention monitoring systems and/or protocols may be used to verify user attention, particularly in cases where there are very long delays between adjustments of the line-of-sight. In a first variant, user inputs (e.g., via various input mechanisms, such as the scroll wheel, can be used to verify attentiveness). In a second variant, user responses (e.g., via one or more input mechanisms) to periodic prompts/queries can be used to validate user attentiveness. In a third variant, eye tracking devices can be used to validate user attentiveness. User attentiveness can be verified/monitored periodically (e.g., every 15 seconds, every 30 seconds, etc.), aperiodically (e.g., on an event driven basis), in response to satisfaction of a trigger condition (e.g., 15 seconds since last adjustment of line-of-sight distance; temporal trigger; vehicle state trigger, such as an object detection trigger; eye-tracking trigger, wearables trigger, etc.), and/or with any other suitable frequency/timing. However, the system can include any other suitable attention tracking system(s), and/or can be otherwise suitably implemented.

In one example, user interactions can include: pressing a first key (e.g., W key) which moves the line of sight/travel distance forward along the track; pressing a second (e.g., S key) which moves the line of sight/travel distance backward (e.g., towards the vehicle/user perspective; proximally) along the track; and pressing the a third key (e.g., Enter key) which authorizes the vehicle to proceed to the end of the travel distance. In some implementations, keys cannot be held down to send multiple commands in succession (e.g., the user may be required to complete a discrete keypress each time they wish to issue a command, proceed authorization, and/or change to line of sight).

In variants, the set of input devices can include redundant power and/or data connections, and/or may continuously/periodically monitor connection integrity. For example, the remote operator platform can optionally include interlocks devices and/or hardware validation systems/functionalities which can validate that the user input mechanism(s) are operational (i.e., that a user monitoring the vehicle is able to stop the vehicle or otherwise intervene to appropriately adjust commands to emergent events). However, the input devices can alternatively be redundant, rely on backup (battery) power sources, and/or can be otherwise configured.

In one example, the tele-operator controls may be locked in response to a determination of a hardware failure (e.g., detected at the remote operator platform), and the remote operator platform can automatically issue a stop command (and/or passively restrict future proceed authorization until control functionality is restored).

However, the remote operator platform can otherwise facilitate remote vehicle monitoring and/or can be otherwise suitably implemented.

In variants, remote operator intervention via the remote operator platform is preferably requested (e.g., push request) by the vehicle and/or motion planner based on the location of the vehicle (i.e., track rules for the current location of the vehicle) and/or vehicle state (e.g., detected potential hazard) in response to satisfaction of a trigger condition or event. For instance, the remote operator may monitor the vehicle as it proceeds through a track region with movement at with movement at restricted speed, and/or may monitor the vehicle as it traverses past a potential hazard. The remote operator may retain command authority until the vehicle has exited a (speed restricted) track region and/or until the remote operator releases command authority. For example, the remote operator platform may facilitate transitions from a remote monitor operation mode to an unmonitored PTC mode (e.g., fully autonomous) in response to an input from a remote operator via the set of input devices.

As a first example, remote operator intervention can be requested and/or queued as described in U.S. application Ser. No. 18/514,946, filed 20 Nov. 2023, which is incorporated herein in its entirety by this reference.

As a second example, when the vehicle departs a speed restricted region of track (e.g., based on track coordinate position), the remote monitoring system can manually (e.g., based on an input from the remote operator) or automatically release control authority to the motion planner, returning the system to waypoint-based control and existing the remote monitoring mode.

However, the system can be otherwise suitably configured and/or can include any other suitable elements.

5. User Interface

The system can optionally include or operate in conjunction with a user interface [UI] which functions to facilitate manual vehicle routing and/or instruction/command of vehicles (e.g., in a yard operations context). Additionally or alternatively, the user interface can function to facilitate tele-operation (e.g., in a restricted speed context), manual updates to track map data (e.g., manual determinations of switch state for unmonitored switches, etc.), manual exception handling, manual operation of track infrastructure (i.e., manual switch state changes and/or state inputs), and/or other manual interventions/inputs. The user interface can be communicatively connected to the motion planner system, the track data system/service, the switch management system, and/or any other suitable data endpoints to provide manual navigation/routing instructions to facilitate vehicle command, dispatch, and/or control. Additionally, user inputs via the user interface can be used to update the track data (e.g., based on manual bulletin inputs, manual switch state inputs, etc.; within the track data system and/or a map service thereof). In a specific example, user input provisions via the UI can be used by the switch management system to maintain a persistent belief state for the switches within the rail network. Additionally, the UI can surface feedback to a user(s) based on data aggregated from other systems/endpoints of the system. The UI can surface feedback which can include: aggregated track data (e.g., managed by map service), vehicle routes (e.g., determined by manual routing and/or a fleet management system) track reservations (e.g., governed by motion planner), switch reservations (e.g., governed by the switch management system), vehicle state data (e.g., based on data received from vehicle controller), switch state data (e.g., determined by the switch management system), map service data (e.g., track map, state data, track rules, bulletins, feature waypoints, etc.), and/or any other suitable data.

In some variants, such as in a yard operation context, user inputs received via the UI can be used to generate vehicle routing instructions (e.g., an example is shown in FIG. 2B) and/or (navigation) commands, which can be used to indirectly control a vehicle(s). For example, users can provide waypoints-based routing commands to the motion planner (e.g., via an API), which can be used to control the vehicle(s) in by the system(s) and/or method(s) as described in U.S. application Ser. No. 18/499,034 filed Oct. 31, 2023, titled "RAIL CONTROL SYSTEM AND/OR METHOD," which is incorporated herein in its entirety by this reference. In variants, the UI may facilitate manual provisions of waypoint-based commands via selection of waypoints (e.g., automatically generated waypoints) in an overlayed satellite image, aerial image, GPS referenced map, and/or another suitable interface. For instance, the UI may facilitate waypoint selection via a web application, API, mobile device (e.g., tablet or other wireless/cellular device), and/or any other suitable device(s)/service(s). In a first example, a yard operator (e.g., in proximity to a train/vehicle) may select predetermined waypoints (e.g., associated with predefined track features; automatically generated from named/mapped track features) via a first device which is communicatively coupled (e.g., wirelessly, by data aggregation service) to the motion planner, such as via a web app and/or API. As a second example, a remote operator may select waypoints via a remote (tele-) operator platform. As a third example, users may select automatically generated waypoints for named track features based on a (semantic) track feature name (e.g., or other index/ID), allowing the user to select the (predefined) geocoordinate waypoint (e.g., without needing to directly input specific coordinates). For instance, a user may select semantic names for a series of switches (and/or clearance points, switch legs, junctions, etc.) to manually generate and assign a route for a particular vehicle. As a fourth example, users may select waypoints to route a vehicle through a series of indexed track switches. However, the UI may otherwise facilitate selection/provision of waypoints. The waypoints can be separately maintained in a waypoint database, managed as a part of the track data service, generated using data from an external database(s) (e.g., a satellite map of Earth; a railroad authority map; etc.), and/or can be otherwise determined. In a first variant, waypoints can be predetermined and/or automatically determined based on the locations of track features. Alternatively, the UI may be used to manually define waypoints (e.g., relative to an aerial image, etc.), and/or may define positions/distances relative to waypoints (or associated track features).

The user interface can be used to determine and/or validate switch states (a.k.a., switch positions) to enable vehicle movement in conjunction with vehicle routing and train control. Additionally, the user interface can direct manual actions to change the state of a switch (e.g., based on existing vehicle routes and/or track rules). For example, users can be notified via the UI of a train approaching a switch (e.g., notification triggered based on the vehicle state, such as when the vehicle is about 0.25 miles away from the switch clearance point or about 1 minute away given the current motion plan), and request that the user modify the switch state (e.g., change configuration from default to route the vehicle to a siding). The user can manually change the switch position and provides confirmation of the switch state change via the UI (e.g., the switch management system can then update the belief state of the switch and reserve the switch to restrict automated/manual modification of the state). Once the train has cleared the switch and a distal switch clearance point (and the reservation of the switch has been released by the switch management system), the user may be notified and/or the switch state may be modified by the user. For instance, the UI may direct the user to modify the switch state to a new target state. Additionally or alternatively, the user may return the switch to a default state, such as lining the switch main-to-main (e.g., which may be required by track rules), once the reservation(s) on the switch are released.

However, the system can include or be used with any other suitable user interface and/or can exclude a user interface.

6. Track Data

The system can include or be used with a track data system which functions to store and/or maintain track data to be used for routing, dispatch, and/or vehicle control. The track data maintained within the track data system can include: a waypoint database; a track geometry (e.g., including a map of track segments, each including an 'edge' extending between a pair of 'nodes'; versioned, such as with an instance identifier and/or timestamp associated with the most recent update; etc.), track features (e.g., track geometry, clearance points, grade crossings, switch states, signal states, bulletins locations, etc.), track conditions (e.g., work zones, SR/RS zones, etc.), and/or any other suitable track data. In an example, the track geometry can be defined by a set of named track features (e.g., mileposts, fractional mileposts, control points, clearance points, signals, switches, stations, terminal locations, crane locations, charger locations, garages, destinations of interest, features/coordinates associated with track rules, etc.), each associated with a geographic location (or 'node'), with track segments defined therebetween, along a linear 'edge' or path between the nodes. The track geometry can be represented as a graph (e.g., of locations/nodes connected by track segments), a map, and/or otherwise represented. The track geometry and/or track data can be predetermined, derived from $3^{rd}$ party data/maps (e.g., railroad maps), received from a railroad authority, and/or can be otherwise determined/updated with any suitable timing/frequency. The motion planner and the vehicle controller can both access and/or locally store track data (e.g., versioned track geometry) for use in any suitable determination/control. Track data can be pushed to the motion planner and/or vehicle controller(s) and/or pulled from the track data system (e.g., by the motion planner and/or vehicle controller) with any suitable timing/frequency. In a specific example, track data pertaining to regions proximal to the vehicle (e.g., within an authority granting region; within a 50-mile radius; a rail yard map at a current location or at a planned destination; etc.) can be pushed to the vehicle controller with any suitable timing/frequency (e.g., as a part of a warrant provision and/or as a part of command provision; separately from provision of commands or authority grants/warrants; etc.). However, the system can otherwise operate with any other suitable track data system and/or track map(s), and/or can otherwise maintain track data knowledge/information sharing throughout the system.

In variants, waypoints (and/or waypoint database) and/or track features (e.g., switches and/or switch states associated therewith) can be entirely independent of the track geometry. For example, track features and/or waypoints associated therewith can be managed in an external database or map service (e.g., tagged locations in a satellite map of Earth, for example) which can be used to generate GPS references for user-selected waypoints. Alternatively, the waypoints can be maintained locally (e.g., managed in a local database using proprietary data collected and/or stored by a server), remotely, via cloud storage/processing, generated (algorithmically) during runtime (e.g., around proximal track features), and/or can be otherwise maintained/managed. Waypoints can be associated with track features (i.e., at least a portion of the waypoints may be associated with and/or defined relative to the Earth-relative position of a track feature), which can include: mileposts, fractional mileposts, control points, clearance points, signals, switches, stations, terminal locations, crane locations, charger locations, garage locations, destinations of interest, and/or any other suitable track features/coordinates associated with track rules. Waypoints can be defined with a GPS/GNSS coordinate position, an Earth-referenced cell (e.g., S2 cells, etc.), a geohash, and/or can be otherwise suitably defined. In variants, waypoints can be automatically generated from (i.e., defined based on the locations of) mapped track features (e.g., from a map service, external database, or separately managed database). As an example, waypoints can be automatically generated from track features in a map, which may allow users to select waypoints relative to (pre-) mapped track features without manually entering a coordinate position for the feature. Waypoints can be automatically generated from mapped track features during runtime (e.g., pulled from a database or map service in proximity to a relevant portion of track, allowing a user to select relevant track features as waypoints), periodically, in response to a pull request, and/or with any other suitable frequency/timing. Automatically generated waypoints can be determined in locations along the track based on system rules and track constraints (i.e., where a vehicle is able to stop). For example, waypoints can be generated in proximity to track features based on track rules, regulatory constraints, and/or system limitations/constraints. A single waypoint can be automatically generated for a track feature (e.g., at a milepost or charging station) and/or multiple waypoints can be automatically generated around a track feature (e.g., on either side of a crossing; on each leg of a switch; etc.). In a first example, waypoints can be automatically generated on the reverse, normal, and facing legs of switches (e.g., which are used as destinations to move the vehicle through the switch and as staging locations to park the vehicle before making a move through the switch; at clearance points which are offset by appropriate clearance distances/constraints on each leg, etc.). In a second example, waypoints can be automatically generated around crossings (e.g., at clearance points offset on either side of the crossing by an appropriate clearance; allowing either side of the crossing to be selected in order to move the vehicle through the crossing and as staging locations to stop the vehicle before making a move through the crossing).

However, the system can otherwise generate and/or manage waypoints, and/or the system can include or be used with any other suitable track data system and/or map service(s).

The track data system can include or operate in conjunction with the switch management system/service. For example, the track data system preferably indexes track coordinates and/or waypoint positions for each switch in the rail network. The switch management service (i.e., layered on top of the track map service, such as in a management hierarchy) can manage the belief state for each switch in the rail network, along with the (current) switch reservations. Accordingly, switch management is preferably indexed globally and/or referenced against the feature waypoints (i.e., semantic waypoints, rather than tied to indices in a particular map version or set of track map coordinates). However, switch management can additionally or alternatively utilize track coordinates/indices associated with a particular map version, and/or can be otherwise managed. Similarly, switch states data and/or switch reservations can be independently managed by the switch management system and/or can be aggregated by the track data system/service and switch data can be pushed to (or pulled by) various endpoints in the system (e.g., in global waypoint coordinates and/or track map geometry).

However, track data can be otherwise suitably managed and/or stored in the system. Additionally or alternatively, databases for track data and/or data resources of the system (e.g., motion plans and/or track reservations managed by the motion planner; switch states and/or switch reservations managed by the switch management system; etc.) can be centralized, distributed, and/or otherwise stored/distributed between system elements. For example, a single database can aggregate: map data (e.g., track map along with track rules/bulletins), switch states, train command and control states (e.g., vehicle state data; vehicle commands and/or motion plans), vehicle routes, external data (e.g., received via an API; such as received from a railroad integration system), and/or any other suitable data (e.g., where individual systems/services manage updates to state data/parameters).

In variants, the system and/or track data system/service thereof can optionally include or be used in conjunction with a railroad integration system/service which functions to translate authority grants from a railroad authority (ies) into a movement authority (a.k.a., macro-warrant) which can be provided to the motion planner (a.k.a., vehicle dispatch system). Additionally or alternatively, the railroad integration system can transform protocol-specific authority grants, issued by a railroad authority, into a unified form (e.g., movement authority). Additionally or alternatively, the railroad integration system can be used to update mapped track data based on information received from the railroad authority (e.g., map updates, track condition updates, track feature updates, bulletin notifications, etc.). For example, map updates received from the railroad integration system and/or railroad authority (e.g., speed restrictions; bulletins; etc.) may be accessed/referenced by the switch management system prior to issuing new switch reservations and/or updating switch states. Additionally or alternatively, map updates may hold reservations for a subset of switches (e.g., with active track bulletins), which may prevent vehicles from being routed through said switches and/or updates to the switch state (e.g., restricting access to switches and/or changes to switch state; such as where switches are under construction/maintenance, for example).

The railroad integration system can receive a set of inputs from the railroad authority, which can include: track signals, authorization forms, track feature updates (i.e., changes to track geometry/features), track condition updates, track bulletins, and/or any other suitable information. The set of inputs is preferably received according to a predetermined protocol, specific to a particular railroad authority, but can be received in any suitable data format. In a specific example, the railroad integration service can include an API (specific to a particular railroad authority; generalized API which can interface with each railroad authority; etc.). Additionally or alternatively, the railroad integration service can be integrated into an API Gateway, can communicate with an API Gateway (e.g., allowing the railroad integration system and/or railroad authority to communicate with the track data system and/or map service such that the data can be accessed by switch management system and motion planner), and/or can be otherwise integrated with and/or interface with various components of the system.

The railroad integration system can determine a movement authority, or a (coarse) authority region of track, based on the inputs from the railroad authority. For example, the movement authority can be defined based on a starting and ending point along the track (e.g., coordinate point, in track map coordinates; relative to track nodes/features/segments, etc.) and can include a set of intervening track sections (e.g., relative to a track map). The inputs can be transformed into movement authorities based on a predetermined set of rules, transformations, and/or protocols (e.g., which can be railroad authority specific or railroad authority agnostic). Movement authorities can be determined as a one-to-one mapping of authority grants from a railroad into a track map reference frame, and/or can be further constrained based on a set of rules/heuristics. For example, movement authorities and/or constraints associated therewith may be used to delineate between 'autonomous' sections of track and 'teleoperation' sections of track (e.g., restricted speed sections, where the authority is only granted under may only under a condition of remote supervision). Similarly, movement authority constraints may establish track rules and/or policies governing switch positions (e.g., default switch position; etc.) and/or switch monitoring/validation (e.g., periodic verification/validation requirements, etc.).

In variants, movement authorities can additionally include a set of operating constraints which can be received from the railroad authority and/or another endpoint (e.g., user interface, fleet management system), and/or can be retrieved from a track data system. For example, the operating constraints can include a speed-constraints (e.g., speed limit), directional constraint (e.g., unidirectional movement constraint, bidirectional movement constraint, etc.), track restrictions (e.g., teleoperation track segments, advisory bulletin restrictions, etc.), time constraints (e.g., expiration parameter associated with the movement authority, etc.), and/or any other suitable operational constraints. The railroad integration system can include processing and/or processing modules which can be: local, remote (e.g., at a remote server, at a third party server, cloud processing, etc.; an element of the remote systems), centralized, distributed, and/or processing for the railroad integration system can be otherwise executed. In variants, movement authorities can be updated by the railroad integration system periodically, aperiodically, in response to receipt of an updated authority grant from a railroad authority, and/or with any other suitable timing/frequency. Additionally or alternatively, movement authorities can be invariant/fixed until completed and/or vacated. In variants, movement authorities can be pushed to the various processing endpoints (e.g., motion planner and/or switch management system), such as in response to movement authority issuance, and/or pulled from data storage (e.g., cloud data service), such by the motion planner and/or switch management system. However, track data can be otherwise suitably determined and/or managed.

In variants, the system and/or data service thereof can optionally include or be used with a set of Application Program Interface (API) Gateways, by which external/user-facing system(s)/components(s) can interface with vehicle dispatch and track data systems/services (e.g., coupling the UI and/or Railroad Service to motion planning, switch management, fleet management, and/or data systems). For example, the API Gateway(s) can handle authorization, Quality of Service (QoS), translation protocols, and/or any other suitable tasks/functionalities. As a second example, the user interface and/or switch management systems can be integrated into the API Gateway and/or can interface with the motion planner via an API Gateway(s). However, the system can be used with any other suitable API(s) and/or without an API Gateway(s) in various contexts.

However, the system can be otherwise configured.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for command of a rail network, comprising:
receiving a respective data packet from each of a plurality of vehicles within the rail network, each respective data packet comprising a vehicle vector clock and vehicle state data;
updating a corresponding vector clock for each vehicle of the plurality of vehicles based on the vehicle vector clock of the respective data packet; and
for each vehicle of the plurality of vehicles, determining a command based on the vehicle state data and the corresponding vector clock;
in response to determining the command for each vehicle of the plurality of vehicles:

incrementing a first logical clock of the corresponding vector clock, wherein a second logical clock of the corresponding vector clock is updated based on the vehicle vector clock; and
wirelessly broadcasting a command packet comprising the command and the corresponding vector clock; and
at a first vehicle of the plurality of vehicles:
responsive to an autonomous operation of the first vehicle, incrementing the second logical clock of the vehicle vector clock;
subsequently, receiving the command packet; and
responsive to a determination that the second logical clock of the vehicle vector clock exceeds the second logical clock of the corresponding vector clock of the command packet, continuing to execute the autonomous operation without responding to the command packet.

2. The method of claim 1, wherein the corresponding vector clocks for each vehicle of the plurality of vehicles are updated at a computing system which is remote relative to the vehicles, wherein each vehicle of the plurality of vehicles is configured to autonomously execute the command for the respective vehicle responsive to establishing causality between the vehicle vector clock maintained onboard the vehicle and the corresponding vector clock at the computing system.

3. The method of claim 1, wherein each vehicle of the plurality is autonomously controlled based on a partial ordering of the vehicle vector clock and the corresponding vector clock.

4. The method of claim 3, wherein a first logical clock of the vehicle vector clock of a second vehicle of the plurality of vehicles is incremented responsive to receipt of the command for the second vehicle; wherein a second logical clock of the vehicle vector clock of a second vehicle is incremented responsive to execution of the command for the second vehicle; wherein the second logical clock of the vehicle vector clock of the second vehicle is further incremented responsive to an autonomous control operation.

5. The method of claim 1, wherein the command packet is repeatedly broadcast without incrementing the corresponding vector clock.

6. The method of claim 1, wherein the respective data packet from each vehicle further comprises metadata, wherein the commands are determined based on the metadata.

7. The method of claim 6, wherein the command packet for each vehicle comprises a set of heartbeat signals based on the metadata, wherein each vehicle of the plurality of vehicles within the rail network is autonomously constrained by the set of heartbeat signals of the command packet.

8. The method of claim 7, wherein a first heartbeat signal is associated with a teleoperator video latency.

9. The method of claim 7, wherein a first heartbeat signal is associated with a roundtrip communication latency with the vehicle.

10. The method of claim 1, wherein each command packet comprises a track reservation for a portion of the rail network and a map version.

11. The method of claim 1, further comprising: at the first vehicle, after receiving the command packet, broadcasting a data packet comprising the vehicle vector clock.

12. The method of claim 1, further comprising, at a second vehicle of the plurality of vehicles:

receiving the command packet for the second vehicle;

based on the command packet for the second vehicle, updating the vehicle vector clock and command state of the second vehicle; and autonomously controlling the second vehicle based on the command state of the second vehicle.

13. The method of claim 1, further comprising: determining satisfaction of a trigger condition corresponding to a communication delay with a second vehicle of the plurality of vehicles, wherein updating the corresponding vector clock of a second vehicle of the plurality of vehicles based on the vehicle vector clock of the respective data packet comprises: responsive to determining satisfaction of the trigger condition, initializing the corresponding vector clock for the second vehicle using the vehicle vector clock of the respective data packet.

14. The method of claim 1, wherein each respective data packet comprises a command state of the respective vehicle of the plurality of vehicles.

15. The method of claim 14, wherein the command comprises an active command configured to modify a motion plan of the vehicle.

16. The method of claim 1, wherein determining the command for a second vehicle of the plurality of vehicles is based on an input from a remote operator.

17. The method of claim 1, wherein each command packet is determined based on the vehicle state of the respective vehicle of the plurality of vehicles and a set of vehicle reservations indexed relative to a track map.

18. The method of claim 1, wherein each command packet further comprises a set of metadata, wherein a vehicle heartbeat mechanism is associated with the set of metadata.

19. The method of claim 1, further comprising updating a Positive Train Control (PTC) track database based on the vehicle vector clock received from each vehicle.

\* \* \* \* \*